United States Patent
Scherzer et al.

(10) Patent No.: US 6,697,644 B2
(45) Date of Patent: Feb. 24, 2004

(54) WIRELESS LINK QUALITY USING LOCATION BASED LEARNING

(75) Inventors: Shimon B. Scherzer, Sunnyvale, CA (US); Piu Bill Wong, Monte Sereno, CA (US); Jiangfeng Wu, Campbell, CA (US); Alexander V. Tesler, Palo Alto, CA (US)

(73) Assignee: Kathrein-Werke KG, Rosenheim (DE)

( * ) Notice: Subject to any disclaimer, the term of this patent is extended or adjusted under 35 U.S.C. 154(b) by 19 days.

(21) Appl. No.: 09/777,613

(22) Filed: Feb. 6, 2001

(65) Prior Publication Data
US 2002/0146983 A1 Oct. 10, 2002

(51) Int. Cl.[7] .................................................. H04B 1/38
(52) U.S. Cl. ................................ 455/562.1; 455/67.11; 455/446
(58) Field of Search .......................... 455/562, 25, 446, 455/449, 422, 67.11; 342/367, 368, 369, 377

(56) References Cited

U.S. PATENT DOCUMENTS

| | | | |
|---|---|---|---|
| 5,095,500 A | 3/1992 | Tayloe et al. | |
| 5,929,823 A | 7/1999 | Martek et al. | 343/817 |
| 5,940,048 A | 8/1999 | Martek | 343/893 |
| 6,108,565 A | 8/2000 | Scherzer | 455/562 |
| 6,195,556 B1 | 2/2001 | Reudink et al. | 455/456 |
| 2001/0003443 A1 * | 6/2001 | Velazquez et al. | 342/367 |

* cited by examiner

Primary Examiner—Lee Nguyen
(74) Attorney, Agent, or Firm—Fulbright & Jaworski L.L.P.

(57) ABSTRACT

The invention provides optimization of communication links by using a control loop with a relatively long time constant and adjusting particular communication links based upon feedback from a virtual communication unit associated with a communication link. A preferred embodiment of the invention optimizes wireless links in a point to multipoint system, such as a cellular communication system, by dividing a service area into segments and adjusting an antenna beam associated with a segment when a mobile unit is operable therein. This preferred embodiment results in convergence upon an optimized communication link over time and is suitable for use even with highly mobile systems. Preferred embodiments of the invention provide control loops for location or segment optimization as well as for individual optimization.

67 Claims, 6 Drawing Sheets

WIRELESS LINK QUALITY USING LOCATION BASED LEARNING

RELATED APPLICATIONS

The present application is related to copending and commonly assigned U.S. patent application Ser. No. 09/229,482 entitled "Practical Space-Time Radio Method for CDMA Communication Capacity Enhancement" filed Jan. 13, 1999, which is a continuation-in-part of U.S. Pat. No. 6,108,565 entitled "Practical Space-Time Radio Method for CDMA Communication Capacity Enhancement," the disclosures of which are hereby incorporated herein by reference.

TECHNICAL FIELD

The invention relates generally to wireless communications and, more particularly, to wireless communication system communication link optimization.

BACKGROUND

In communication systems it is typically desired to provide at least a threshold level of service quality while maximizing system capacity. For example, in point to multipoint wireless communication systems, such as those commonly used in providing cellular telephone and personal communication services (PCS), subscribers generally require that a service provider provide communications having at least a minimum level signal quality, such as link quality equivalent to plain old telephone service (POTS), that service be available substantially all the time, e.g., limited number of blocked calls, and that communications be successfully completed, e.g., no dropped calls.

In wireless communication systems in particular communication quality and communication capacity often have an inverse relationship. For example, as communication capacity is increased, such as through more dense reuse of traffic channels, signal quality may be decreased, such as through each such traffic channel experiencing higher levels of interference energy. Accordingly, service providers must often balance providing desired levels of communication capacity with service quality issues.

In code division multiple access (CDMA) networks, for example, a number of communication signals are allowed to operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit. However, despreading of the desired communication unites signal results in the receiver not only receiving the energy of this desired signal, but also a portion of the energies of other communication units operating over the same frequency band. Accordingly, CDMA networks are interference limited, i.e., the number of communication units using the same frequency band, while maintaining an acceptable signal quality, is determined by the total energy level within the frequency band at the receiver.

In order to provide reasonable capacity in the CDMA network, transmitted signals are often power controlled to reduce energy transmitted within the CDMA frequency band while maintaining sufficient power to provide an acceptable signal at a receiving unit. Through intelligent power control, excess energy within the service area may be limited and, therefore, signal quality improved and/or capacity increased.

Accordingly, in a cellular communication network, a base transceiver station (BTS) or the like, may operate to receive information from mobile units with respect to a received signal as experienced by the mobile unit in order to make determinations as to the transmit power level to be utilized in communications with this particular mobile unit. This is an example of closed control loop operation.

However, a problem that has been experienced in implementing such a closed loop system is that, in order for the control loop to perform correctly, typically a relatively large amount of information must be communicated in the reverse link, e.g., a mobile unit provides substantial data in the reverse link in order for the BTS to adequately and accurately control transmit power levels. Moreover, generally speaking, the better the desired performance, e.g., more the transmit power is optimized for experienced conditions, the more information which is required to be fed back. It should be appreciated that, when providing feedback information for the closed control loop operation, the control system is occupying resources of the reverse link. In a system in which communications are substantially symmetric, such as is typical in two way voice communication, utilization of reverse link capacity for transmission of information not directly associated with subscriber payload is often a critical concern. Accordingly, it is often desirable to minimize the use of reverse link capacity for such control loop operation.

Further capacity and/or signal quality improvement may be provided in communication systems, such as the aforementioned point to multipoint wireless communication systems, through the use of directional antenna beams in the communication links. For example, adaptive array antennas may be utilized to provide enhanced signal quality through advanced "beam forming" techniques as shown and described in the above referenced patent application entitled "Practical Space-Time Radio Method for CDMA Communication Capacity Enhancement." For example, angle of arrival (AOA) information determined from a received signal at an adaptive array antenna may be utilized in accurately determining beam forming coefficients for use in the reverse link in order to provide improved capacity.

Although it is possible to estimate suitable forward link beam forming coefficients from corresponding reverse link beam forming coefficients, this solution does not always provide desired results. Specifically, this method relies upon a sufficiently high correlation between reverse link and forward link spatial structure. However, this is not always the case. For example, a difference in forward link and reverse link frequencies may result in there being insufficient correlation between the links. Additionally, the various multi-paths experienced in the two links may be significantly different.

A mobile unit might be adapted to accurately evaluate the forward link channel (spatial and temporal) in order to provide forward link channel information to a BTS for use in beam forming. However, there is a challenge in relaying this channel information to the serving BTS. Initially, it should be appreciated that current BTS infrastructure does not provide reverse link signaling adapted to communicate such information and, therefore, would require adaptation of the BTS systems as well as the mobile units. For example, the IS-95, GSM, and G3 interface standards provide very little reverse link capacity for such control signals. Moreover, as discussed above, it is desirable to minimize the use of reverse link capacity for control loop operation in order to provide desired subscriber payload capacity. Accordingly, the addition of forward link channel information to the aforementioned power control information, which itself is already consuming valuable reverse link capacity, is typically undesirable.

A need therefore exists in the art for systems and methods which allow for optimization of communication system capacity and signal quality without requiring an unacceptable amount of feedback information. A further need exists in the art for such systems and methods to provide forward link beam forming for optimized operation utilizing information with respect to evaluation of the forward link spatial channel by a receiving unit.

SUMMARY OF THE INVENTION

The present invention is directed to systems and methods which provide optimized communication links for communication conditions experienced by a plurality of subscriber units. For example, preferred embodiments of the present invention utilized in optimizing communication links in a cellular wireless communication system operate to control antenna beam width (e.g., antenna beam main lobe contour), length (e.g., antenna beam signal transmission power level), and/or direction (e.g., bore sight azimuthal and/or elevation orientation) selected and/or refined to thereby provide effective communications.

Although forward link characteristics may be optimized given enough feedback from mobile units, the amount of information required for accurate and adequate forward link channel optimization typically exceeds the reverse link capacity available for such uses. For example, link characteristics are often a function of signal fading (shadowing and Raleigh) which, in a highly mobile environment such as that of mobile cellular communications, require substantial amounts of information provided at a relatively rapid intervals in order to optimize a particular mobile unit's communication links. Preferred embodiments of the present invention implement a control loop in a point to multipoint system which provides a suitable amount of information for link optimization of an entire population of forward link beams rather than, or in addition to, controlling individual forward link beams. Accordingly, a preferred embodiment of the present invention divides a service area associated with a point to multipoint system, such as a cell associated with a cellular communication system BTS, into a plurality of segments such that beam forming parameters are optimized with respect to these segments as mobile units operate therein.

In operation according to a preferred embodiment of the present invention, a cell is divided into a grid of segments. When a mobile unit operates in the cell the system determines the direction and distance of the mobile unit and, accordingly, determines a particular segment the mobile unit is operating within, retrieves a currently optimized forward link antenna beam for use with that segment, and illuminates the mobile unit with that antenna beam. As the mobile unit operates within that segment a control loop (also referred to herein as a segment control loop) is preferably operated to further optimize the segment's forward link antenna beam. Preferably, when the mobile unit ceases to operate within that segment the control loop with respect to that mobile unit's operation within the segment's forward link antenna beam is stopped. The currently determined antenna beam configuration be stored in the configuration database for later retrieval and use, if desired. If the mobile unit appears within another segment, the process is repeated with respect to the antenna beam associated with that subsequent segment. Accordingly, for each segment in the grid, the preferred embodiment system provides a control loop which minimizes the forward link antenna beam as time progresses and the subscribers pass through the cell.

Embodiments of the present invention may be configured such that segments are defined in which a number of mobile units may be simultaneously operable therein. Accordingly, in a preferred embodiment, a segment control loop as described above is operated for optimization of the segment's forward link antenna beam which utilizes information with respect to a plurality of mobile units operable within the segment. For example, information associated with all, or some subset, of the mobile units currently operable in the segment may be utilized, such as by averaging, weighted averaging, or other statistical combining, to thereby optimize the segment's forward link antenna beam.

The control loops of the present invention may converge on the optimum antenna beam configurations over a period of days, weeks, and months. However, such a relative slow control loop is expected to be acceptable in many implementations, such as a cell site retrofit because the continuing time wise improvement in capacity and/or signal quality as the antenna beams are optimized over that of a typical prior art BTS implementation provide desired signal quality and/or capacity increase.

Link characteristics in a highly mobile environment are subject to change rapidly and may vary appreciably at different locations, even within a segment. Accordingly, segment control loops of the present invention are preferably adapted to provide optimization of communication links such that link conditions experienced by one mobile unit, or some minority of mobile units, do not undesirably affect optimization decisions. For example, a particular mobile unit may remain stationary in a particular segment for a very long time while substantially all other mobile units pass through the segment at a high rate of speed. If a control loop were to continuously utilize link characteristic information associated with this stationary mobile unit, the forward link of the segment would likely tend to converge to a link optimized for this particular mobile unit, which may result in a forward link which is less than optimum for the remaining mobile units. Therefore, preferred embodiment control loops are adapted to optimize a forward link antenna beam associated with the segment's forward link without allowing a single or a few mobile units to undesirably affect the optimization results.

A preferred embodiment of the present invention recognizes the existence of a stationary, relatively slow moving, or otherwise anomalous mobile unit or subset of mobile units and alters utilization of information associated with that mobile unit or subset of mobile units in optimizing the forward link. For example, an embodiment of the present invention operates to cease utilization of information associated with that mobile unit or subset of mobile units in optimizing the segment forward link. A preferred embodiment of the present invention provides a control loop for that mobile unit or a subset of mobile units (also referred to herein as an individual control loop) which further optimizes a forward link for use with such a mobile unit or subset of mobile units. However, because this further optimized forward link is not expected to be representative of the forward link conditions experienced throughout the associated segment, a preferred embodiment of the present invention does not operate to update a segment optimized forward link database.

According to an alternative embodiment of the present invention, rather than providing the aforementioned individual control loop, the segment control loop may operate to continue to use information associated even with a stationary, relatively slow moving, or otherwise anomalous mobile unit, but is adapted to mitigate undesired affects resulting therefrom. For example, information associated with the various mobile units may be weighted such that operation of the anomalous mobile units does not result in an undesired segment forward link.

Preferably, communication link parameters are optimized according to the present invention utilizing forward link channel information, such as frame error rate (FER), bit energy to noise ratio (Eb/No), angle spread, and/or like information, provided by a receiving unit disposed in a corresponding segment. According to a preferred embodiment, the forward link channel information utilized is information available at the mobile unit without specific adaptation according to the present invention, such as the aforementioned FER or Eb/No information as may be used in providing prior art power control. The use of such information is preferred as such information may already be provided in an existing closed control loop and, therefore, not require the use of additional reverse link capacity in implementing the present invention. Additionally or alternatively, embodiments of the present invention may utilize forward link channel information which requires adaptation of mobile units in order to estimate, such as the aforementioned angle spread. Preferably, such information is selected such that it may be carried in an existing control loop without substantial alteration thereof and/or without requiring a substantial increase in control loop use of reverse link capacity.

To reduce the impact upon reverse link capacity while still providing information sufficient for an accurate understanding of the forward link channel characteristics, the preferred embodiment of the invention optimizes the beam forming parameters over a significant amount of time. For example, embodiments of the present invention operate to optimize beam forming parameters throughout the operation of an associated BTS.

Preferred embodiments of the present invention are adapted to provide optimization of communication links in response to a plurality of experienced phenomena. For example, operation of the present invention may provide optimization of an antenna beam such that the antenna beam is narrowed from an initial antenna beam configuration to a minimum beam width suitable for serving a particular segment. Thereafter, operation of the present invention may provide optimization of this antenna beam such that the antenna beam is widened and/or the antenna beam direction changed in order to adjust for an environmental change, such as the construction of a building in an area between the BTS and the particular segment.

A technical advantage of the present invention is provided in that the amount of information feedback utilized in implementing a control loop, preferably adjusted and controlled over a very long period of time, according to the invention is minimized. A further technical advantage of the present invention is provided in that the control loop feed back utilized according to preferred embodiments utilizes control loop information which is already available, thereby minimizing alteration of standard system interfaces, system equipment, and the like in order to implement the present invention.

A technical advantage of the present invention is provided in the optimization of a forward link for segments based upon information provided by a plurality of receiving units operable therein over time using a segment control loop. A still further technical advantage is provided in the optimization of a forward link for individual receiving units which have operating characteristics suitable for optimization without undesirably burdening a reverse link using an individual control loop over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
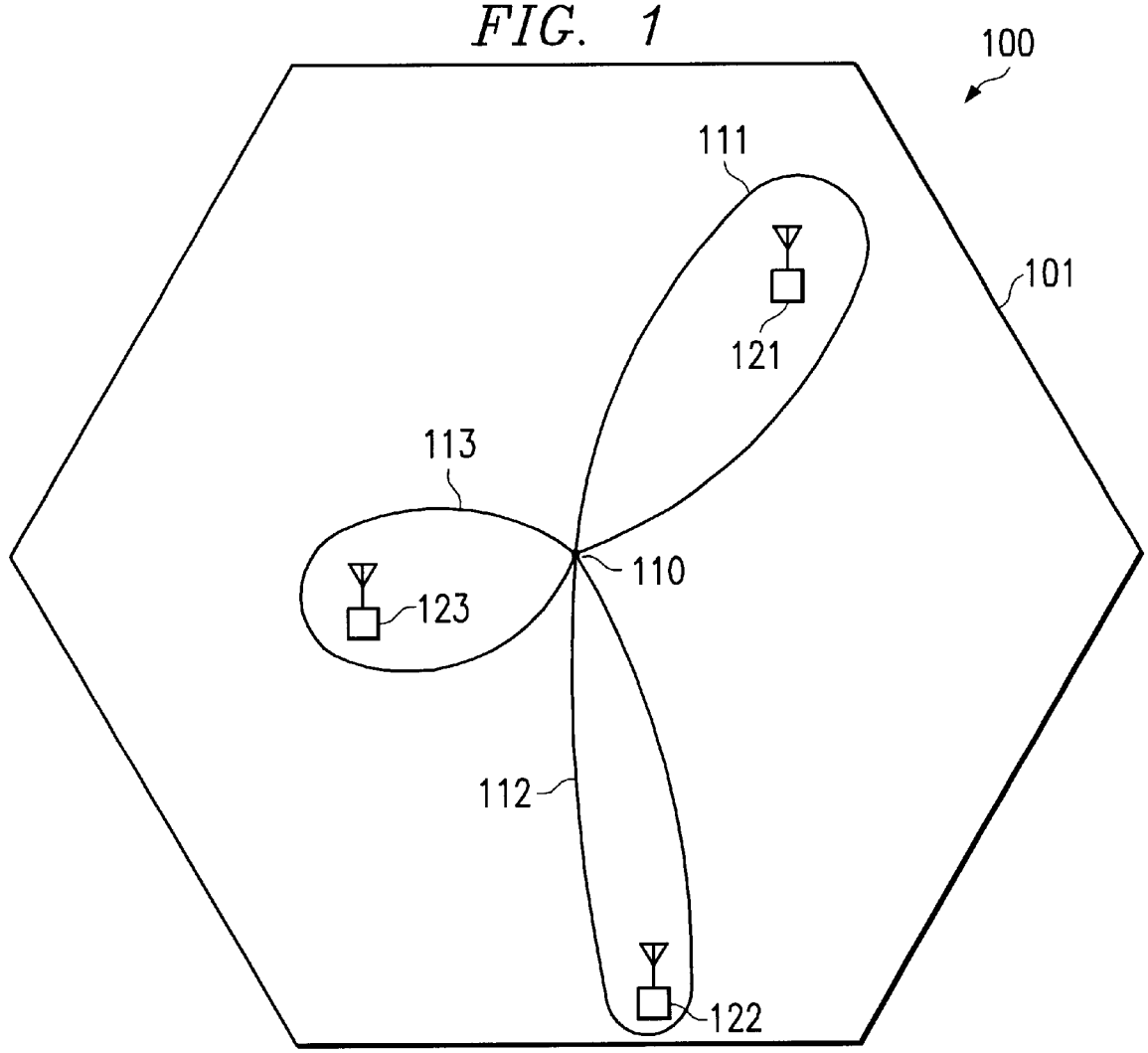
FIG. 1 shows a point to multipoint system providing forward link communication links which may be optimized according to the present invention.

Directing attention to FIG. 1, wireless communication system 100, such as may provide cellular telephone or PCS communications, is shown providing information communication between base transceiver station (BTS) 110 and a plurality of mobile units, mobile units 121–123, disposed within cell 101. Specifically, BTS 110 has associated therewith antenna beams 111, 112, and 113 corresponding to mobile units 121 122, and 123, respectively, providing a wireless communication links there between.

BTS 110 is preferably adapted to include an array antenna (not shown) for use in forming directional antenna beams such as antenna beams 111–113, such as shown and described in the above referenced patent application entitled "Practical Space-Time Radio Method for CDMA Communication Capacity Enhancement," commonly assigned U.S. Pat. No. 5,940,048, or commonly assigned U.S. Pat. No. 5,929,823, the disclosures of which are hereby incorporated herein by reference. Moreover, BTS 110 preferably operates under control of a processor based system (not shown) such as may be disposed at BTS 110, e.g., a BTS controller, or disposed at a centralized location, e.g., a base station cluster controller (BSCC), network operations center (NOC), mobile switching center (MSC), or the like. This controller preferably includes a central processor unit (CPU), associated memory, and operates under control of an instruction set defining operation as set forth herein. For example, the controller may be comprised of a general purpose computer system, such as a personal computer system based on the INTEL PENTIUM processor platform. Alternatively, the controller may be comprised of a special purpose processor based system, such as might be uniquely adapted for operation as set forth herein using specially configured circuitry, such as application specific integrated circuitry (ASIC), firmware instruction sets, and/or the like.

It should be appreciated that communication system 100 may include a plurality of cells (not shown), such as cell 101, having corresponding BTSs associated therewith, such as might be laid out in a cellular reuse pattern as is well known in the art. However, to simplify the concepts described with respect to the present invention, only a single cell has been illustrated with respect to communication system 100.

Preferably each of antenna beams 111–113 are optimized for providing desired communications with a corresponding one of the mobile units without unnecessarily introducing interference energy in the service area associated with communication system 100. For example, each of beams 111–113 are preferably substantially minimized, e.g. the antenna beam bore sight is properly directed and the antenna beam width and/or length are minimized, to provide a substantially maximized gain with respect to the particular mobile unit or mobile units served and to contain the signal energy associated with this particular mobile unit or mobile units in as small a portion of the service area of communication system 100 as is possible. However, such optimization of communication links is often problematic.

A controller associated with BTS 110 may operate in conjunction with an array antenna of BTS 110 to determine link channel characteristics, such as spatial and temporal link channel characteristics. For example, BTS 110 may analyze signals received from the mobile units in order to determine an angle of arrival (AOA) and a distance associated with each such mobile unit. Angle of arrival information may be determined from analysis of the signals as received at various antenna elements of the array antenna and distance may be determined by analysis of signal round trip delay and/or time of arrival (TOA), for example. A preferred embodiment for determining such link channel characteristic information is shown and described in the above referenced patent application entitled "Practical Space-Time Radio Method for CDMA Communication Capacity Enhancement," previously incorporated herein by reference.

Using such link channel information beam forming parameters, e.g., complex weighting coefficients associated with signals of various antenna elements of the array antenna, suitable for providing reverse link antenna beams optimized for the link channel may be determined. These determined beam forming parameters may then be utilized in forming a suitable reverse link antenna beam which is minimized in length and/or width and which is directed toward the appropriate mobile unit.

One technique of providing forward link antenna beams specifically adapted for communication conditions actually experienced would be to rely upon the above described reverse link determinations to estimate suitable forward link beam forming coefficients. However, this solution does not always provide desired results because this method relies upon a sufficiently high correlation between reverse link and forward link spatial structure. A difference in forward link and reverse link frequencies, variations in the multi-paths experienced in the two links, and like dissimilarities between the two link channels may result in there being insufficient correlation between the links to provide a desired forward link beam estimated from reverse link channel characteristics.

Accordingly, another technique of providing forward link antenna beams specifically adapted for communication conditions actually experienced would be to adapt the mobile units to evaluate the forward link channel characteristics and provide forward link channel information to the BTS for use in beam forming. For example, mobile unit 121 of FIG. 1 may measure forward link channel characteristics, such as AOA, time of arrival (TOA), receive signal strength, frame error rate (FER), bit error rate (BER), average bit energy to noise density (Eb/No), and/or like signal attributes related to channel characteristics, and provide this channel characteristic information to the BTS for use in determining forward link beam forming parameters. However, the amount of information required for accurate and adequate forward link channel optimization in such a system can be quite great. Furthermore, in a mobile communication system, the information is prone to rapid changes as relative locations are changed. Accordingly, low speed beam control loops for continuously optimizing an antenna beam associated with the mobile unit are typically not sufficient.

For example, link characteristics are often a function of signal fading (shadowing and Raleigh) which, in a highly mobile environment such as that of mobile cellular communications, require substantial amounts of information provided at a relatively rapid intervals in order to optimize a particular mobile units communication links. Accordingly, in order to provide sufficient information for forward link antenna beam optimization as mobile unit 121, which might be deployed in a moving vehicle traveling at highway speeds, moves about cell 101, mobile unit 121 may be required to measure one or more of the above characteristics at relatively rapid intervals. At 65 MPH mobile unit 121 changes its location by over 95 feet per second, suggesting beam forming coefficients should be updated in intervals on the order of milliseconds to avoid unacceptable signal degradation resulting from signal fading associated with such movement. It should be appreciated that there is a challenge in relaying this forward link channel information to the BTS both because current BTS infrastructure does not provide reverse link signaling adapted to communicate information sufficiently rapidly and/or in such quantities and because it is generally desirable to minimize the use of reverse link capacity for control loop operation in order to provide desired subscriber payload capacity.

Accordingly, preferred embodiments of the present invention implement a control loop in a point to multipoint system which provides a suitable amount of information for link optimization of an entire population of forward link beams rather than controlling individual forward link beams.

Figure 2:
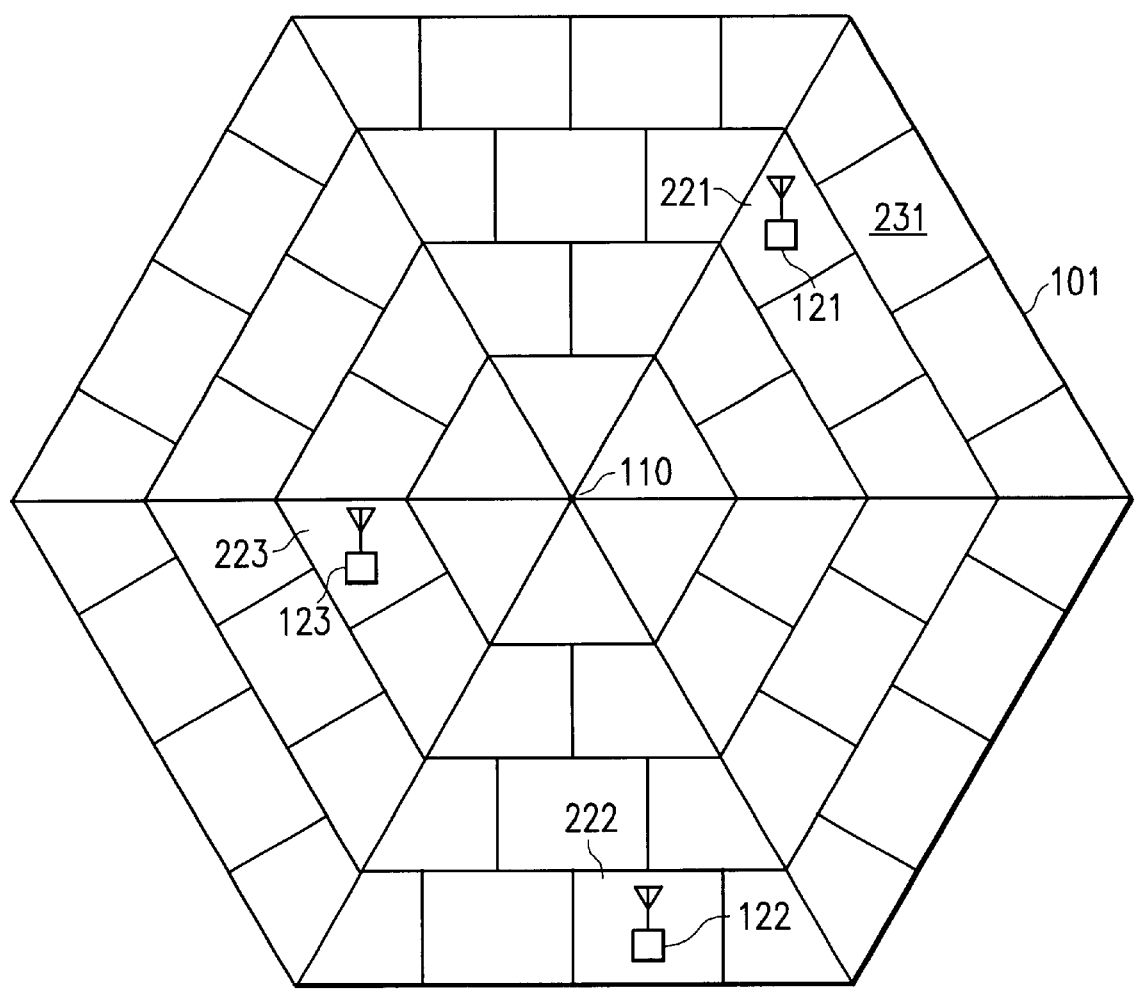
FIG. 2 shows the point to multipoint system of FIG. 1 having a grid of segments defined therein according to a preferred embodiment of the present invention.

Directing attention to FIG. 2, a preferred embodiment of the present invention is shown in which the service area associated with a point to multipoint system is divided into segments for which forward link antenna beams may be optimized throughout operation of the system. As shown in FIG. 2, cell 101 has been overlaid with a grid to define a plurality of segments therein, e.g., segments 221, 222, and 223. It should be appreciated that the grid shown in FIG. 2 is not physically established with respect to cell 101, but rather is an imaginary demarcation of segment regions which may be associated with antenna beams according to the present invention. Moreover, as it is generally not possible to completely confine signal energy associated with an antenna beam to exact geometric shapes, therefore the particular segment grid arrangement shown in FIG. 2 is intended to be exemplary of that which may be used according to the present invention. Accordingly, the size, number shape, orientation, and configuration of any or all service area segments may be altered from those shown.

The present invention preferably implements an accurate mobile unit location capability, such as may be implemented as part of the BTS, to associate particular mobile units with particular ones of the aforementioned segments. CDMA systems, having relatively wide frequency spectrum bandwidth, allow distance measurement accuracy to approximately 100 meters and AOA accuracy to better than 2 degrees. Accordingly, cell site using CDMA communication protocols having a radius of approximately 2 Km, may implement location finding using distance and AOA measurements, such as shown and described in the above reference patent application entitled "Practical Space-Time Radio Method for CDMA Communication Capacity Enhancement," to locate a mobile unit to a resolution of less than 100 m by 100 m. Such an embodiment suggests the use of segments of approximately 10,000 square meters, providing approximately 3600 segments in the aforementioned 2 Km radius cell. Of course, other location detection techniques may be utilized in place of, or in combination with the above described location technique. According to embodiments of the present invention, the mobile unit location techniques may rely upon location information provided by the mobile units themselves. For example, mobile units may be provided with global position satellite (GPS) circuitry to provide mobile unit position information to the BTS in a reverse link control channel. Additionally or alternatively, mobile unit position determination techniques may be used such as shown and described in copending and commonly assigned United States patent application serial number 08/892,946 entitled "System and Method of Determining a Mobile Stations Position Using Directable Beams," the disclosure of which is hereby incorporated herein by reference.

Using segments of the preferred embodiment in a point to multipoint system, the BTS may provide segment control loops in association with mobile units in communication therewith which operate to control a plurality of forward link beams, even the entire population of forward link beams, instead of or in addition to a control loop controlling an individual mobile station forward link beam. For example, a preferred embodiment of the present invention controls antenna beams associated with virtual mobile units, where a virtual mobile unit is a mobile unit located within a particular segment. According to this embodiment, a segment control loop for a particular segment antenna beam is activated only when a virtual mobile unit exists, i.e., a mobile unit actually occupies a given segment and/or meets other criteria, such as has not remained stationary for more than a predetermined amount of time, has not remained within the segment for more than a predetermined amount of time, does not display atypical behavior, etcetera. As the mobile unit travels outside of a particular segment it ceases to represent the virtual mobile unit associated with that segment. However, as another mobile unit enters that particular segment, although it may or may not be the same mobile unit which previously occupied the segment, the virtual mobile unit associated with that segment may again be represented. Correspondingly, the mobile unit traveling from this particular segment to another segment may represent a virtual mobile unit associated with the next segment after having represented the virtual mobile unit associated with the particular segment it previously occupied.

Preferably, at least a current beam forming parameter set associated with each segment is stored in a database operable with the control system. Accordingly, as mobile units begin operation within a particular segment this beam forming parameter configuration may be selected to establish a communication link therewith. Additionally, preferred embodiments of the present invention store additional sets of beam forming parameters for one or more of the segments. For example, historical beam forming parameter information may be stored in order to provide an alternative antenna beam configuration or configurations to utilize in case of undesired operation in the segment by a mobile unit. Additionally or alternatively, this additional information with respect to particular segments may include antenna beam configurations determined to provide undesired link characteristics, such as poor signal quality experienced by a mobile unit operating in the segment or unacceptable amounts of interference being introduced into areas outside of the associated segment. The additional information may go beyond providing beam forming parameters, such as to provide information with respect to particular communication channels which may or may not be utilized within a segment or which may or may not be used with particular antenna beam configurations.

According to a preferred embodiment of the present invention a nonvolatile data memory is used to store the aforementioned database. The database information is preferably location indexed such that beam forming configuration information for grid segments is identifiable by AOA and TOA information. However, according to a preferred embodiment when a mobile unit is in soft handoff, e.g., changing between sectors of a particular cell, beam forming configuration information for a grid segment associated with that mobile unit is preferably identifiable by AOA alone.

The aforementioned database may be initialized prior to operation according to the present invention with antenna beam configurations associated with each segment which are determined to be likely to provide acceptable communications throughout the associated segment while providing a minimum threshold level of system performance. For example, cellular communication systems are often implemented with a three sectored configuration in which communication channels of a particular cell are assigned for use in three substantially non-overlapping 120 degree sectors. Although not providing signal quality and/or capacity increases available according to the present invention, such a configuration has been widely adopted as providing acceptable signal quality and capacity. Therefore, an initial configuration of the present invention may utilize 120 degree antenna beam configurations associated with the various segments which, over time, are optimized by operation of the present invention to provide improved signal quality and/or capacity.

A preferred embodiment segment field of a beam configuration database of the present invention is represented in the table below as including information with respect to a beam width, a frame counter, a frame error counter, a maximum beam width, a minimum beam width, and a frame error rate threshold. The beam width information preferably provides a beam width and/or other beam configuration information, at a currently updated level of optimization, to be used with mobile units disposed in the associated sector. For example, the beam width information may provide an index reference to a hierarchy of antenna beam configurations to identify a particular beam width configuration for use with the particular segment. The hierarchy of beam configurations may provide beam forming characteristics for a number of different radiation patterns selectable for use with segments of the present invention. The beam width information stored in the segment field may therefore include not only the aforementioned index reference, but may include information specific to the segment's use of the identified beam configuration, such as an azimuthal orientation for the formed beam. The frame counter preferably provides an optimization control loop epoch timer. The frame error counter preferably provides a measure of forward link channel quality during a control loop epoch. The frame error rate threshold preferably provides a reference for determining an acceptable forward link configuration. Preferably the initial values of the information stored in the segment fields of the beam configuration database is as shown in the table below and is updated during operation of the communication system as described herein.

Beam Configuration
Database Segment Field Parameters and Byte Requirements

| Parameter | Bytes | Initial value |
|---|---|---|
| beam width (B Wave) | 1 | Sector beam width |
| Frame counter (FC) | 3 | 0 |
| Frame error counter (EC) | 3 | 0 |
| Maximum beam width (BWmax) | 1 | Sector beam width |
| Minimum beam width (BWmin) | 1 | Minimum allowable beam width |
| FER threshold (FER$_{thres}$) | 1 | 0 |

It is expected that such a database would require approximately 430 k bytes for a typical cell segmented in 360 degrees with 120 distance levels (360 AOAs*120 distances provides 43,200 segments).

As discussed above, information in addition to or in the alternative to the above identified information may be stored in the beam configuration database of the present invention. A preferred embodiment stores information for use in system operation, debugging, and/or statistical analysis in addition to that identified above. For example, additional information stored and indexed by segment by a beam configuration database of the present invention is represented in the table below as including information with respect to transmit power, a power sample counter, frame error counter, and a frame counter, as shown in the table below. The transmit power information preferably provides information with respect to the average transmission power associated with a segment, such as may be computed by the equation:

$$TX_p(new) = \frac{TX_p(old) * N_{ps} + DGU^2}{N_{ps} + 1}$$

where DBU represent digital gain unit. The power sample counter information preferably provides information with respect to the number of power samples having been used for the transmit power calculation. The frame counter preferably provides a diagnosis or statistical operation epoch timer. The frame error counter preferably provides a measure of forward link channel quality during a diagnosis or statistical operation epoch. Preferably the initial values of this information stored in the fields of the beam configuration database are as shown in the table below and is updated during operation of the communication system as described herein.

Additional Utilization, Debug, and Statistical Analysis Parameters

| Parameter | Bytes | Initial value |
|---|---|---|
| TX power (TXp) | 2 | 0 |
| Power sample counter (Nps) | 4 | 0 |
| Frame Error Counter | 3 | 0 |
| Frame Counter | 4 | 0 |

It is expected that such information would require approximately 5602 k bytes for a typical cell segmented in 360 degrees with 120 distance levels.

Generally speaking, it is expected that the optimized forward link beam width will be wider for beams associated with segments disposed at close proximity to the BTS and more narrow for beams associated with segments disposed at farther distances from the BTS. This situation is proffered as acceptable in many situations, such as the aforementioned cellular communication systems, as it is expected that most subscriber units will be at the outer cell regions.

According to preferred embodiment operation, when a mobile unit is disposed within a particular segment for a sufficient period of time, a beam forming control loop executes an optimization step or steps to optimize an antenna beam associated with this segment. For example, antenna beam 111 shown in FIG. 1 may be associated with segment 221 of FIG. 2. Accordingly, BTS 110 may provide a forward link to mobile unit 121 via antenna beam 111 while mobile unit 121 is disposed in segment 221, as may be determined using the aforementioned location finding techniques. Provided mobile unit 121 is disposed in segment 221 for some appreciable amount of time, mobile unit 121 may provide forward link channel information to BTS 110 for further optimization of antenna beam 111. Further optimized antenna beam 111 may be utilized in providing a forward link to mobile unit 121 and/or subsequent mobile units disposed in segment 221.

When the mobile unit moves to another segment, the system preferably continues the link using an antenna beam associated with this other segment which, if the mobile unit is disposed within this segment for a sufficient period of time, is optimized by a control loop step or steps as described above. For example, mobile unit 121 may move from segment 221 to segment 231, as may be determined using the aforementioned location finding techniques, and BTS 110 may utilize beam forming parameters to form an antenna beam (not shown) having characteristics adapted for communication within segment 231 for providing the forward link to mobile unit 121. The antenna beam associated with segment 231 may differ from that associated with segment 221 (antenna beam 111) by such attributes as an azimuthal orientation, beam width, beam length, and/or an amount of down tilt, for example.

Accordingly, the preferred embodiment of the present invention implements a segment control loop having a relatively long time constant. For example, it may take days, weeks, or even months for sufficient feedback to be provided with respect the forward link channel conditions associated with communication in a particular segment. In areas of high traffic, the segment control loop will operate faster to optimize forward link antenna beams while in areas of lower traffic, the segment control loop will operate more slowly to optimize forward link antenna beams. Although a long control loop time constant is typically insufficient to provide adequate beam forming for highly mobile systems, the present invention's optimization of antenna beams for segments provides antenna beams optimized over time which are well suited for use even with the highly mobile systems because the control loop optimizes segment antenna beams based upon a cell's morphology rather than an individual mobile unit's dynamics. Since cell morphology is not expected to change rapidly, the rather lengthy control loop constant of this embodiment of the invention is acceptable.

An embodiment of the present invention ceases antenna beam optimization when a minimized antenna beam configuration is achieved. For example, optimization algorithms may be implemented for an amount of time determined to provide for a desired level of antenna beam minimization. Alternatively, the antenna beam resulting from optimization epochs may be monitored to detect a point at which further minimization of the antenna beam ceases or proceeds at a diminimous rate and at such point operation of the optimization algorithm is suspended.

Preferred embodiments of the present invention operate to provide link optimization for extended periods of time, such as throughout the operational life of a communication system. Accordingly, not only may operation of the present invention provide optimization of an antenna beam such that the antenna beam is narrowed from an initial antenna beam configuration to a minimum beam width suitable for serving a particular segment, but so too may operation of the present invention provide optimization of this antenna beam such that the antenna beam is widened, or the antenna beam direction changed, the transmit power increased, etcetera, in order to adjust for an environmental change, such as the construction of a building in an area between the BTS and the particular segment.

Having a relative long control loop time constant, the preferred embodiment of the present invention is able to provide a sufficient amount of information for achieving link optimization without heavily burdening a reverse link signaling channel, even when used in systems where the mobile units are highly mobile as in the example discussed above. Accordingly, preferred embodiments of the present invention are operable to optimize forward link channels based upon a few receive signal characteristics, or even a single receive signal characteristic, monitored by mobile units.

For example, beam forming parameters of a preferred embodiment are optimized utilizing a frame error rate (FER) or bit energy to noise ratio (Eb/No) measured by mobile units and provided to the BTS through a reverse link control channel. Of course, alternative embodiments of the present invention may utilize a combination of these monitored communication attributes and/or other attributes indicative of forward link channel characteristics, such as angle spread, and/or like information. It being appreciated, however, that preferred embodiments of the present invention utilize a number and/or type of measured attribute which may be easily communicated to a corresponding BTS in an available reverse link control channel According to a preferred embodiment, the forward link channel information utilized is information available at the mobile unit without specific adaptation according to the present invention, such as the aforementioned FER or Eb/No information as may be used in providing prior art power control. The use of such information is preferred as such information may already be provided in an existing closed control loop and, therefore, not require the use of additional reverse link capacity in implementing the present invention.

Additionally or alternatively, embodiments of the present invention may utilize forward link channel information which requires adaptation of mobile units in order to estimate, such as the aforementioned angle spread. Preferably, such information is selected such that it may be carried in an existing control loop without substantial alteration thereof and/or without requiring a substantial increase in control loop use of reverse link capacity.

Figure 3:
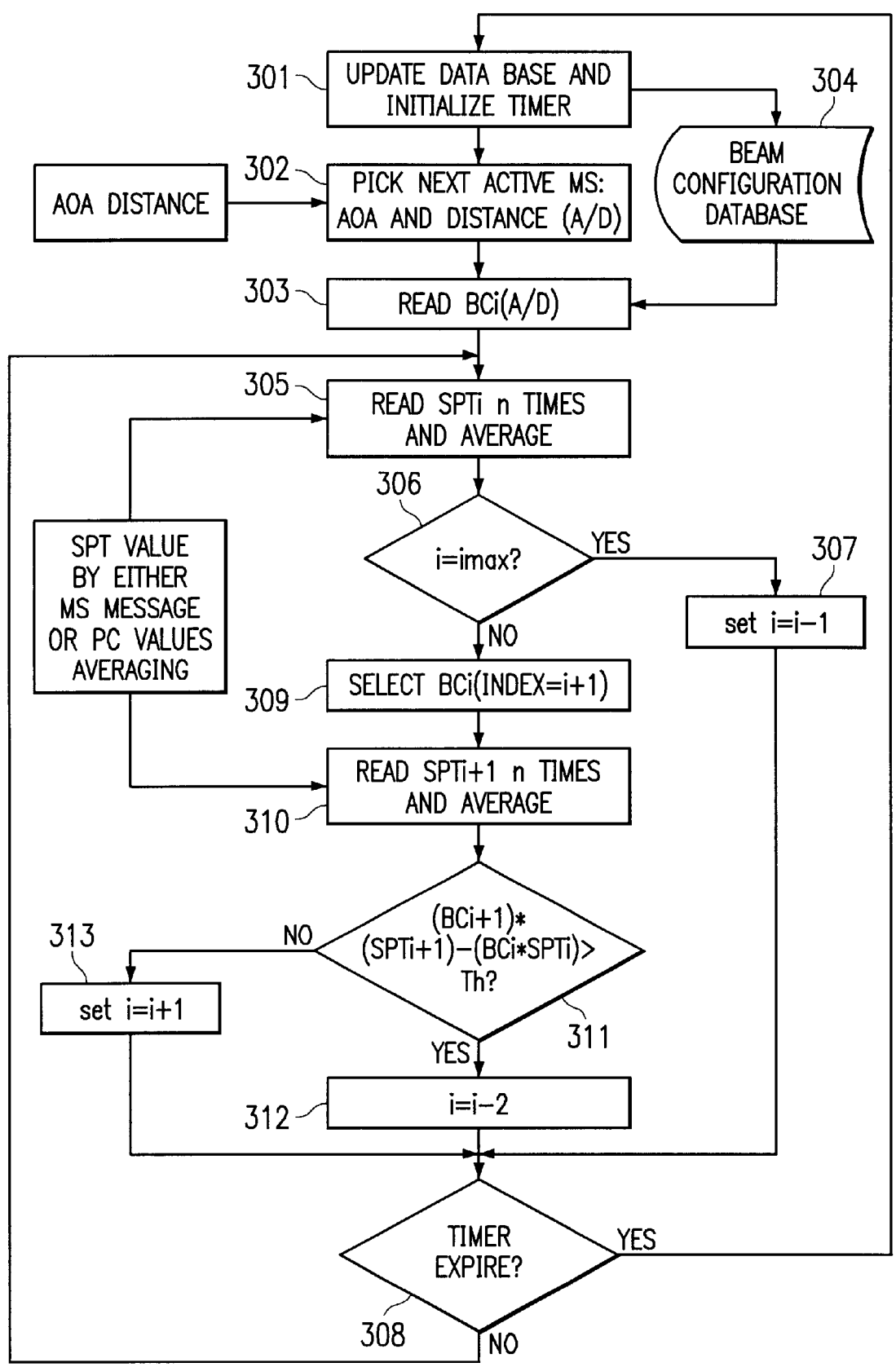
FIG. 3 shows a flow diagram of operation according to a preferred embodiment of the present invention.

Directing attention now to FIG. 3, a high level flow diagram of operation according to the present invention to provide antenna beam optimization is shown. The illustrated process is designed to continuously optimize forward link antenna beams for active calls and update the preferred embodiment forward link antenna beam configuration database.

Step 301 of the illustrated embodiment operates to update beam configuration database 304 (which may include information such as described with reference to the tables above) with the currently determined beam configuration for the various segments. Preferably, the beam width database is defined for a cell site or other service area using a grid that divides the area according to system location accuracy as described above. Accordingly, each grid location entry of the beam configuration database (e.g., using AOA and distance as an index) preferably includes an initial or last updated beam configuration (e.g., beam width value, beam azimuthal orientation value, beam elevation orientation value, transmit power level value, and/or other communication link attribute information).

According to the illustrated embodiment, step 301 also operates to initiate an optimization epoch timer (e.g., FC). The timer of this embodiment is provided as a means for triggering the process to revisit the database for beam configuration updating and/or to analyze communications with respect to another mobile unit. It should be appreciated, however, that other triggering means may be utilized according to the present invention. For example, algorithms utilized according to the present invention may perform a particular number of measurement iterations with respect to a mobile unit or a segment before proceeding to another mobile unit or segment for similar analysis. Of course, multiple concurrent threads of the illustrated process may be implemented, such as a thread corresponding to each active mobile unit or each segment in which a mobile unit is active, if desired.

According to the illustrated embodiment, an active mobile unit is selected at step 302 and location information associated with this mobile unit is determined. In the illustrated embodiment AOA and distance information is utilized at step 302 in determining the selected mobile units position within the service area, although other techniques may be used.

At step 303, the location information of the selected mobile unit is utilized to locate an appropriate antenna beam configuration for use in providing a link thereto. Specifically, in the illustrated embodiment, the location information identifies the selected mobile unit with a particular segment of the service area and the current beam configuration information (BCi(A/D) or BWave), where i represents the relative position of the beam configuration in a beam configuration hierarchy and A/D represents the segment index) associated with this segment is located within beam configuration database 304 and retrieved.

The channel characteristic information associated with use of the current beam configuration with the selected mobile unit is read, e.g., the current beam configuration is implemented to provide a communication link with the selected mobile unit and channel characteristic information is accepted and/or solicited from the selected mobile unit, at step 305. Preferably, in order to provide an amount of hysteresis to determinations with respect to optimizing the forward link according to the present invention, such as may be associated with movement of the selected mobile unit within the segment and/or temporary link anomalies, the illustrated embodiment provides an average of the channel characteristic reading, e.g., the set point Eb/No which is a function of the FER, associated with the selected mobile unit. Of course, other techniques for providing hysteresis may be utilized, such as a weighted mean and/or utilizing historical channel characteristic information associated with the selected mobile unit and/or the segment, if desired. Moreover, the present invention may provide different degrees of hysteresis depending upon such considerations as the environment into which the system is deployed, historical and/or prophetic system operation characteristics, and the like. For example in case of "simple" environment such as rural areas, hysteresis might be minimized. However, in case of "complex" environment such as urban with high rises, hysteresis might be increased, such as by increasing the number of cycles used for beam configuration optimization steps. Additionally, each may be used with respect to a different mobile unit, thereby assuring a "worst case" or "averaged case" for the segment by accounting for different mobile unit positions within one segment.

At step 306 a determination is made as to whether the current beam configuration is at a system limit (imax or BWmax). For example, depending upon the antenna array configuration utilized with the present invention, antenna beams may be limited to minimizing the beam width to a particular predetermined amount. A preferred embodiment implementation utilizes beam forming circuitry and an antenna array configuration adapted to provide variable width antenna beams from approximately 360 degrees to approximately 3 degrees. Accordingly, if the current antenna beam configuration defines an antenna beam of 3 degrees, a system limit has been reached for which further antenna beam width reduction cannot be had without alteration of system components.

According to the illustrated embodiment, if the current beam configuration is at a system limit, the beam configuration is set to a beam configuration which is not at the system limit (step 307). For example, the beam configuration index may be backed off one or more steps in the beam hierarchy to select a previous or less aggressive beam configuration.

Operation of the present invention may operate to analyze a seemingly optimized beam configuration to determine if that configuration is or remains a best choice. Accordingly, after selection of a beam configuration different than the system limit beam configuration at step 307, the illustrated embodiment proceeds to determine if the epoch for analysis with respect to the selected mobile unit has expired (step 308) and, if not, processing again returns to step 305 for reading of channel characteristic information associated with use of this alternative beam configuration with the selected mobile unit. However, if the epoch for analysis with respect to the selected mobile unit has expired (step 308) processing returns to step 301 for update of the beam configuration data base and initialization a subsequent mobile unit analysis epoch timer.

If however, the current beam configuration is determined not to be at a system limit (step 306), the beam configuration is set to a new, preferably more aggressive, beam configuration (step 309). For example, the beam configuration may be advanced a step in the beam hierarchy to a next beam configuration. Thereafter, processing proceeds to step 310 where channel characteristic information associated with use of this next beam configuration with the selected mobile unit is read. Preferably, a determination is made as to whether a change in channel characteristics is the result of selection and implementation of the selected beam configuration or due to some other anomaly, such as signal fading etc. Accordingly, the preferred embodiment operates to average the information or otherwise mitigate anomalous link condition indicators, such as are described above with respect to step 305.

At step 311 a determination is made as to whether implementation of the selected beam configuration provides communication link improvement over the current beam configuration. For example, according to the illustrated embodiment channel characteristic information associated with the less aggressive beam configuration (here a power level associated with the less aggressive beam determined from multiplying the beam configuration and the corresponding set point information) is subtracted from channel characteristic information associated with the more aggressive beam configuration (here a power level associated with the more aggressive beam determined from multiplying the beam configuration and the corresponding set point information) to determine if the more aggressive beam configuration provides some threshold level of improvement. In the illustrated embodiment if the difference between the more aggressive beam configuration channel characteristic information and the less aggressive beam configuration channel characteristic information is less than a preselected threshold value (it being appreciated that in the illustrated embodiment an increase in the channel characteristic information value indicates a decrease in link quality), a conclusion that the selected beam configuration provides a desired level of improvement over the current beam configuration is made. Thereafter, processing proceeds to step 313 where the beam configuration index may be advanced one or more steps in the beam hierarchy to select a next or more aggressive beam configuration. After selection of a new beam configuration index at step 313, processing according to the illustrated embodiment proceeds to step 308 for a determination as to whether the optimization epoch for the selected mobile unit has expired.

However, if the difference between the more aggressive beam configuration channel characteristic information and the less aggressive beam configuration channel characteristic information is greater than a preselected threshold value, a conclusion that the selected beam configuration does not provide a desired level of improvement over the current beam configuration is made. For example, the channel characteristic information may indicate that a phase mismatch exists between the pilot channel and the traffic channel or that a decrease in traffic channel signal level to interference is experienced associated with the narrowing of the antenna beam. Accordingly, thereafter, processing proceeds to step 312 where the beam configuration index may be backed off one or more steps in the beam hierarchy to select a previous or less aggressive beam configuration. Operation of the illustrated embodiment of the present invention preferably backs off the beam configuration index in order to operate to analyze a seemingly optimized beam configuration to determine if that configuration is or remains a best choice. Specifically, although it is determined in step 311 that a more aggressive beam configuration does not provide improvement over the current beam configuration, the preferred embodiment operates to further analyze the current beam configuration to determine if a less aggressive beam configuration provides improvement over the current beam configuration. Accordingly, after selection of a new beam configuration index at step 312, processing according to the illustrated embodiment proceeds to step 308 for a determination as to whether the optimization epoch for the selected mobile unit has expired. Preferably, the present invention operates to minimize the transmit power level as well as other communication link characteristics and therefore attempts to minimize the gradient of the communication link attributes (e.g., transmit power level and beam width) by implementing configuration change decisions again and again.

Although the embodiment illustrated in FIG. 3 is described above with respect to measuring a current beam configuration link, selecting another beam configuration, measuring the selected beam configuration link, and comparing the current and selected beam configuration results, the present invention is not limited to such an embodiment. For example, alternative embodiments of the present invention measure several iterations of implementation of a particular beam configuration in order to provide a more accurate indication of the link conditions actually experienced over time. For example, a current beam configuration may be implemented as discussed above, followed by implementation of a selected beam configuration as discussed above, which is again followed by implementation of the current beam configuration. The repeated implementation of the current beam configuration may itself be followed by repeated implementation of the selected beam configuration, and so on. Accordingly, the channel characteristic information compared may be more representative of that experienced during the communications link.

Moreover, operation of the present invention is not limited to comparing implementation of two link configurations. For example, operation of the present invention may routinely compare more than two beam configurations, such as a beam configuration more aggressive and a beam configuration less aggressive than a current beam configuration or a beam configuration one iteration more aggressive and a beam configuration two iterations more aggressive than a current beam configuration.

Although the embodiment of the invention illustrated in FIG. 3 has been described above with reference to a determination as to whether implementation of the selected beam configuration provides communication link improvement over the current beam configuration by comparing a difference of channel characteristic information associated with the more aggressive beam configuration and channel characteristic information associated with the less aggressive beam configuration, it should be appreciated that other basis of such a determination may be used according to the present invention. For example, a threshold link quality value may be compared to the channel characteristic information associated with the more aggressive beam configuration to determine if the more aggressive beam configuration provides an acceptable link.

It should be appreciated that the above threshold value may be selected so as to update a beam configuration database with a new beam configuration only when an appreciable or minimum level of improvement is experienced. Such a threshold value may be utilized to provide hysteresis in the update of the beam configuration and may be selected based upon factors such as how many or how few beam configuration updates are desired, network environment and implementation issues, the level of resolution desired with respect to optimized communication links desired, and the like. Of course, if any incremental communication link improvement is to result in the updating of the beam configuration database, the aforementioned threshold value may be set to zero, if desired.

Figure 4:
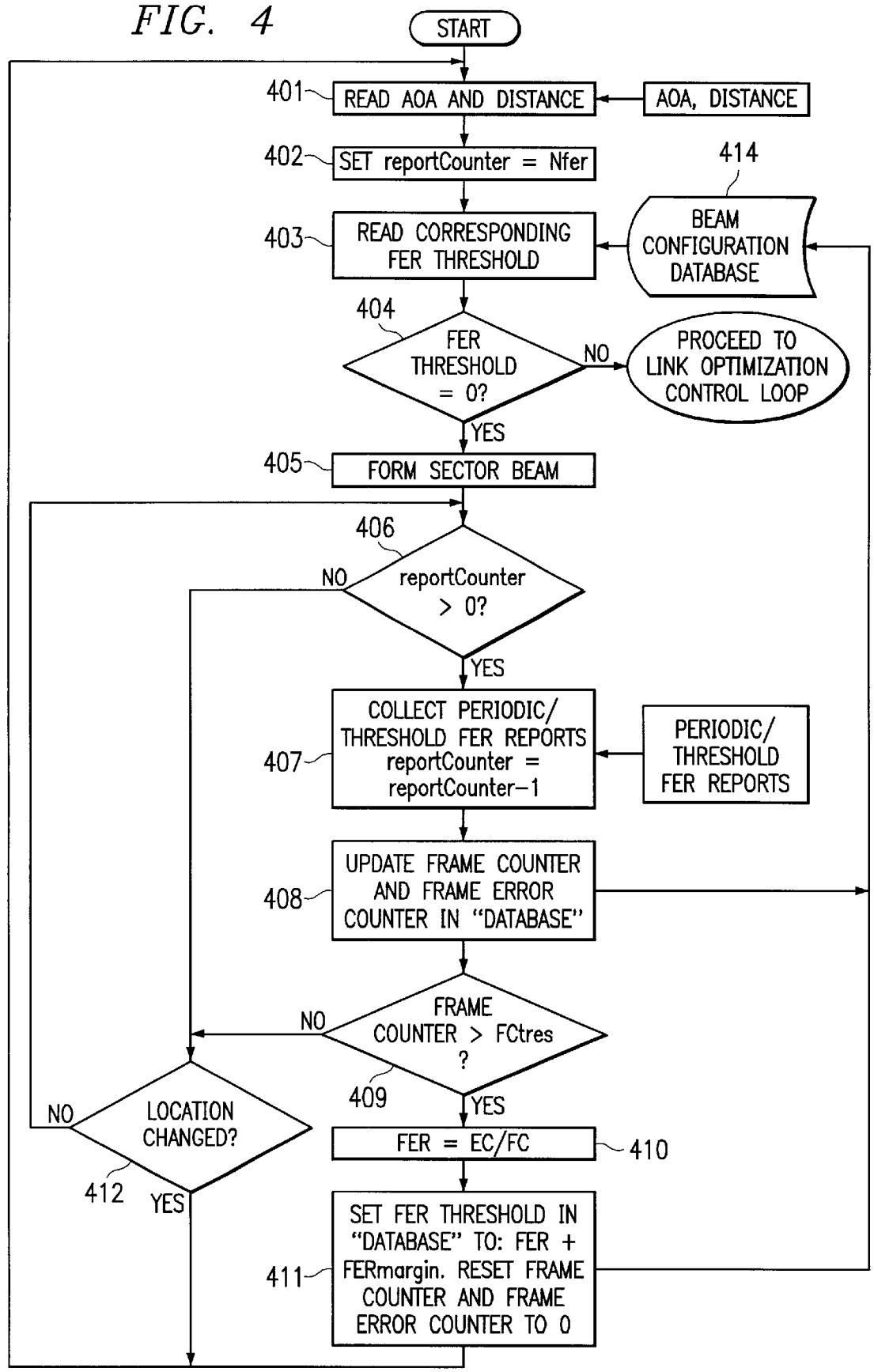
FIG. 4 shows a flow diagram of determination of a preferred embodiment threshold value utilized according to the present invention.

A preferred embodiment flow diagram for establishing a threshold value for use according to the present invention is shown in FIG. 4. The embodiment of FIG. 4 provides an algorithm by which a frame error rate threshold ($FER_{thres}$) value may be selected for use in comparing to channel characteristic information of a particular beam configuration in determining if the beam configuration provides an acceptable or desirable link. Preferably, the algorithm of FIG. 4 is operable to use a sector, or other baseline, beam configuration and collect channel characteristic information from multiple mobile units for each segment of a preferred embodiment grid and determine a threshold value for use in association with the segments.

In the algorithm of FIG. 4 an active mobile unit is selected at step 401 and location information associated with this mobile unit is determined. In the illustrated embodiment AOA and distance information is utilized at step 401 in determining the selected mobile unit's position within the service area, although other techniques may be used. This information may be utilized to determine a particular segment the mobile unit is operable within and, therefore, identify information associated with that segment within a database of the present invention.

At step 402 a mobile unit report counter is set to a maximum for use in limiting the number of reports associated with a particular mobile unit that are used in determining a segment's threshold. Specifically, each mobile unit is preferably allowed to contribute only $N_{fer}$ reports for a particular segment in order that the collected FER for a segment is representative of the whole segment.

At step 403 the threshold value associated with a segment the selected mobile unit is operable within is read from database 414 (which may be the same as database 304 discussed above and which may include information such as described with reference to the tables above). This threshold value will preferably be initialized as zero and updated in the database only upon completion of at least a predetermined number of frame counts for which channel characteristic information has been measured. Accordingly, additional information associated with the particular segment and/or threshold value may be read from database 414, such as a frame count associated with an ongoing threshold value determination, a frame error counter associated with an ongoing threshold value determination, a segment beam configuration, etcetera.

At step 404 a determination is made as to whether the threshold value associated with a segment the selected mobile unit is operable within is zero. According to the preferred embodiment, if the threshold value is zero a threshold value determination has not yet been made. For example, although channel characteristic measurements may have been taken with respect to one or more mobile units operable within the segment, measurements have not been made with respect to a sufficient number of frame counts and, therefore, the determination of a threshold value to associate with the segment has not fully concluded. It should be appreciated that different methods of determining if a threshold value has been determined may be used according to the present invention, including the use of a value (even a negative value) different than the illustrated zero initial value.

If at step 404 it is determined that the threshold value read from database 414 is not zero, indicating a threshold value determination according to the preferred embodiment has been made, processing preferably proceeds to operation of a control loop of the present invention, such as the control loop of FIG. 3 described above or the control loop of FIG. 5A described below. However, if it is determined that the threshold value read from database 414 is zero at step 404, indicating a threshold value determination according to the preferred embodiment has not been made, processing preferably proceeds to step 405.

At step 405 a baseline link is established with respect to the selected mobile unit such that benchmark channel characteristic information may be determined. The baseline link is preferably one which is determined to be likely to provide acceptable communications throughout the particular segment. For example, a sector beam configuration which illuminates a particular segment may be relied upon to provide such a baseline link while providing a radiation pattern which is compatible with prior art system configurations, such as channel reuse plans.

At step 406 a determination is made as to whether the report counter associated with the selected mobile unit is greater than zero. According to the illustrated embodiment, if the report counter reaches zero, a maximum number of reports associated with the operation of the selected mobile unit within the particular sector has been reached and, therefore, further reports from the selected mobile with respect to this segment are not desired. This reporting limit is preferred as it prevents operation of any one particular mobile unit, which might not be a fair representation of operation within the full extent of the segment, from dominating the threshold value determination.

If at step 406 it is determined that the report counter associated with the selected mobile unit is not greater than zero, indicating that the maximum number of reports has been made, processing preferably proceeds to step 412 where further threshold determination processing with respect to the selected mobile unit is prevented until the mobile unit changes segments. However, if it is determined that the report counter associated with the selected mobile unit is greater than zero, indicating that the maximum number of reports has not been made, processing preferably proceeds to step 407.

At step 407 channel characteristic information is collected with respect to operation of the selected mobile unit within the particular segment. For example, in the illustrated embodiment, where the threshold value determined includes a FER threshold, periodic FER report (reports provided by a mobile unit with respect to the experienced frame error rate provided by the mobile at scheduled intervals such as every particular number of frames etc.) and/or threshold FER report (reports provided by a mobile unit with respect to the experienced frame error rate provided by the mobile upon the occurrence of a trigger condition such as when a predetermined number of frame errors are detected) information is collected for use in determining an acceptable threshold FER value according to the present invention.

As shown in step 407, the report counter associated with the selected mobile unit is also preferably decremented to indicate an iteration of reporting has been provided by the mobile unit. Accordingly, the remaining number of reports that will be accepted from this selected mobile unit is decreased.

At step 408 the illustrated embodiment operates to update segment information associated with the operation of the threshold determination. For example, frame count (FC) information and frame error count (FE) information may be updated in database 414 for use with subsequent threshold determination steps, such as after the selected mobile unit leaves this particular segment or reaches the maximum reporting limit of the preferred embodiment.

At step 409 a determination is made as to whether the frame counter associated with the particular segment is greater than a predetermined value ($FC_{thes}$). According to the illustrated embodiment, if the frame counter reaches the predetermined value, a number of reports associated with the operation of various mobile units within the particular sector has been reached and, therefore, a broad enough sample has been taken to determine a threshold value. According to the preferred embodiment, this predetermined value $FC_{thres}$ is selected to be greater than the report counter in order to ensure that multiple mobile units are sampled for the threshold value determination. The particular value of this predetermined value $FC_{thres}$ may be selected based on a number of considerations, including the size of the segment, the complexity of the scattering pattern associated with the segment, the topology of the segment, user patterns within the communication system and/or the segment, and the like.

If at step 409 it is determined that the frame counter associated with the particular segment is not greater than the predetermined value, indicating that a desired number of reports with respect to the particular sector have not been made, processing preferably proceeds to step 412 where, if the selected mobile unit has not changed segments, threshold determination processing returns to step 406, but, if the selected mobile unit has changed segments, threshold determination processing returns to step 401. However, if it is determined that the frame counter associated with the particular segment is greater than the predetermined value, indicating that the a desired number of reports with respect to the particular sector have been made, processing preferably proceeds to step 410.

At step 410 baseline channel characteristics, are computed for the segment. According to the illustrated embodiment, the computed channel characteristic, a frame error rate, is determined by dividing the frame error count (FE) for the segment by the frame count (FC) for the segment.

At step 411 a threshold value of the present invention is determined from the baseline channel characteristics computed in step 410. Specifically, the illustrated embodiment determines a threshold frame error rate by summing the computed frame error rate with a frame error margin. The frame error margin used in this determination may be a value, a percentage of the frame error rate, or some amount by which the frame error rate which is actually experienced in operation may vary from the calculated frame error rate and still provide acceptable communications. It should be appreciated that the frame error margin may be positive, negative or even zero.

The illustrated embodiment also operates to reset the frame counter (FC) and frame error counter (FE) stored in database 414 to zero. Accordingly, these values may be utilized by other processes and/or other iterations of the threshold determination algorithm. For example, although the above threshold determination algorithm has been described above with reference to an initial determination of a threshold value, threshold values may be updated according to the present invention, such as during non-peak hours, to adapt to cell geometry structure changes, if desired.

It should be appreciated that, depending upon the grid resolution, or segment size, selected for use according to the present invention, there may be appreciable variations in the forward link channel spatial characteristics associated with mobile unit operation in various positions throughout a segment and/or associated with characteristics of a particular mobile unit. For example, a mobile unit may be disposed behind or in front of large building, changing the spatial characteristic quite significantly over another mobile unit operating in the same segment.

Embodiments of the present invention resolve this issue by utilizing a sufficient observation period. For example, data may be collected over a sufficient period to account for substantially all or a statistically appreciable number of conditions within a particular segment. It should be appreciated that optimizing a particular forward link antenna beam for implementation in all such conditions may result in a forward link beam having one or more attributes which are not as minimized as may be possible with optimization for only the single point associated with a particular mobile unit. For example, with non-uniform scattering characteristics in a segment, an optimization control loop of the present invention may converge to an average beam configuration for the segment. However, particular implementations of the present invention may be selected so as to balance the amount of forward link antenna beam minimization achievable with the amount and speed at which forward link channel information is provided by the mobile units and/or with the size of the segments utilized according to the present invention.

Figure 5A:
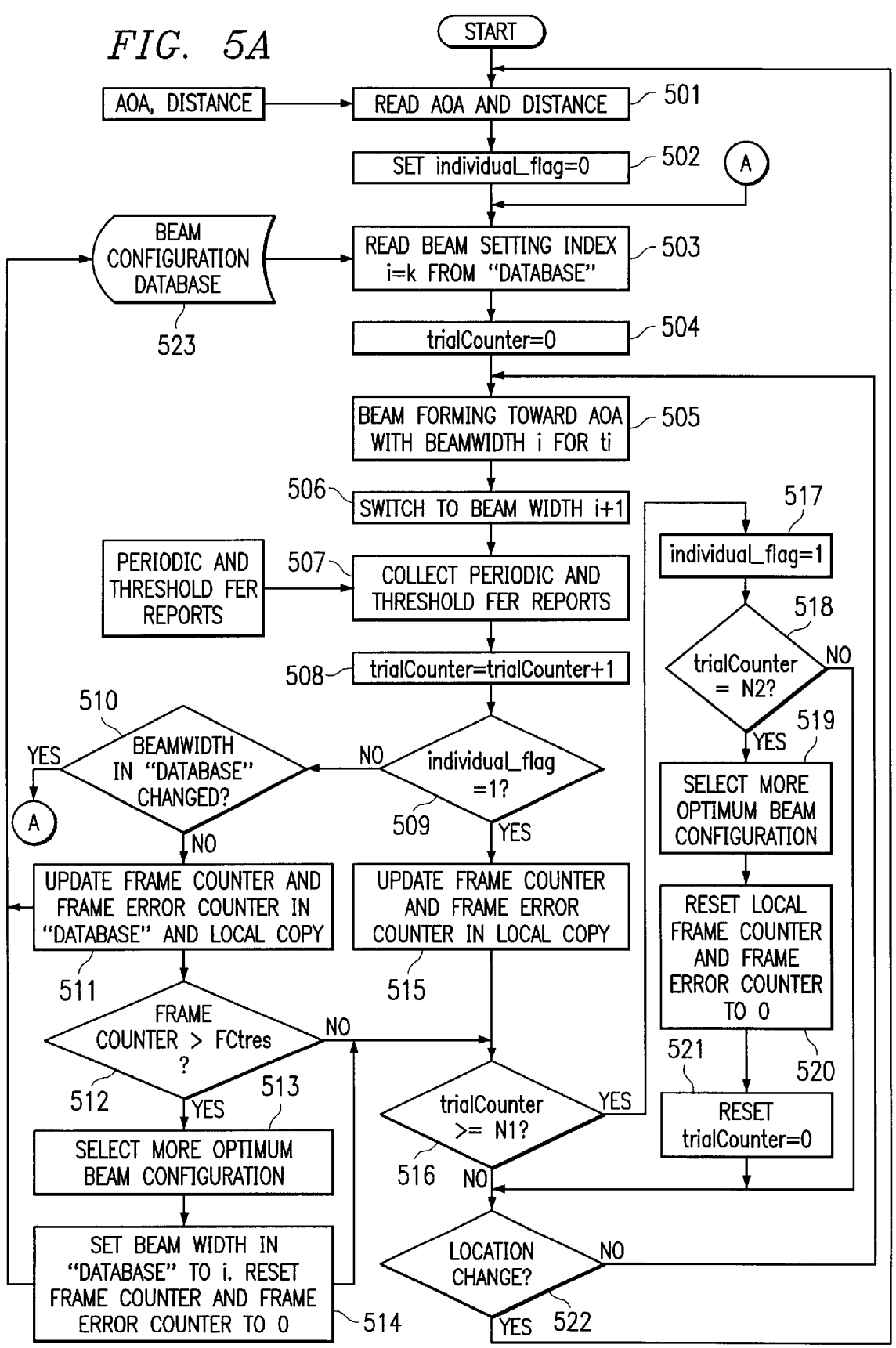
FIG. 5A shows a flow diagram of operation according to a preferred embodiment of the present invention.

A high level flow diagram of a preferred embodiment adapted to provide forward link optimization with respect to a plurality of mobile units operable within a segment is shown in FIG. 5A. Generally, the flow diagram of FIG. 5A provides a segment control loop, to optimize a segment forward link using information with respect to one or more mobile units operable therein, as well as an individual control loop, to optimize a forward link associated with an individual mobile unit or some subset of mobile units which exhibit usage patterns which may adversely affect segment beam configuration optimization according to the present invention.

At step 501 of the illustrated embodiment an active mobile unit is selected and location information associated with this mobile unit is determined. It should be appreciated that, although the operation of the algorithm of FIG. 5A is described herein with reference to a selected mobile unit, the optimization of communication links according to the algorithm is operable with a plurality of mobile units. Specifically, the algorithm of FIG. 5A may be implemented for each of a plurality of mobile units, in order to optimize communication links. Where multiple mobile units are disposed within a same segment of the present invention, communication link optimization information is preferably shared, such as through use of combined or averaged channel characteristic information in the optimization determinations.

In the illustrated embodiment AOA and distance information is utilized at step 501 in determining the selected mobile unit's position within the service area, although other techniques may be used. This information may be utilized to determine a particular segment the mobile unit is operable within and, therefore, identify information associated with that segment within a database of the present invention.

At step 502 an individual flag is set to zero. The individual flag of this embodiment is utilized in determining when a segment control loop or an individual control loop is to be implemented. Specifically, according to the preferred embodiment, when a mobile unit exhibits usage patterns which are likely to result in a segment beam configuration which may be undesirable for use throughout the segment, the individual flag is changed to indicate operation of the individual control loop is desired.

At step 503 database 523 (which may be the same as database 414 discussed above and which may include information such as described with reference to the tables above) is read to determine the current beam configuration (BWave) for use in providing communications within the particular segment the selected mobile unit is operable within. For example, where database 523 stores index information with respect to a beam configuration of a hierarchy of beam configurations currently selected as the optimum configuration for the particular segment, the currently selected beam configuration i is set to the stored, preferably at least partially optimized, beam configuration k.

At step 504 a trial counter is set to zero. The trial counter of the preferred embodiment provides information for a determination of when a mobile unit exhibits usage patterns which are likely to result in a segment beam configuration which may be undesirable for use throughout the segment. For example, if the trial counter associated with the selected mobile unit reaches a predetermined value (N1) then it is determined that the mobile unit has remained within the particular segment a sufficiently long period of time to result in further segment beam configuration optimization using information with respect to this mobile unit potentially providing a segment beam configuration which is not desirable for use by other mobile units within the particular segment.

At step 505 the current antenna beam configuration (BWave) associated with the particular segment, as determined by reference to information stored within database 523, is implemented for providing a communication link with the selected mobile unit. Preferably, this stored current beam configuration is utilized in providing a link with the selected mobile unit for a predetermined amount of time ($t_i$) or for some other measurable epoch. Accordingly, communications may be reliably established with the selected mobile unit using a beam configuration empirically shown to provide acceptable communications within the particular segment. During this current beam configuration epoch various things may be accomplished, such as establishing communications, exchanging overhead or control channel information, providing some minimum amount of information communication, and the like. Moreover, link optimization information may be exchanged and/or collected, such as measuring the channel characteristics experienced by the selected mobile unit using the current beam configuration.

However, at step 506 an alternative beam configuration is implemented to further optimize the segment beam configuration according to the present invention. For example, in the illustrated embodiment a next more aggressive beam configuration from a hierarchy of beam configurations (beam configuration i+1) is selected for use with the selected mobile unit.

At step 507 channel characteristic information is collected with respect to operation of the selected mobile unit within the particular segment. For example, in the illustrated embodiment, periodic FER report and/or threshold FER report information, preferably including the number of measurement frames and the number of detected bad frames within the measurement period, is collected for use in determining an optimum beam configuration according to the present invention.

At step 508 the trial counter associated with the selected mobile unit is preferably incremented to indicate an iteration of reporting has been provided by the mobile unit. Accordingly, the remaining number of reports that will be accepted from this selected mobile unit for use in the segment control loop for segment beam optimization is decreased.

A determination is made at step 509 as to whether the individual flag indicates that the individual control loop of this embodiment has been implemented or if the segment control loop of this embodiment is presently implemented. According to the illustrated embodiment, if the individual flag is determined to be one, processing continues to step 515, for updating of local registers for use in individual beam configuration optimization, and the associated steps of the individual control loop (the operation of which are discussed in detail below). However, if the individual flag is determined not to be one, segment beam configuration optimization processing continues to step 510.

At step 510 a determination is made as to whether the beam configuration stored in the beam configuration database (BWave) has been changed. As mentioned above, it is expected that the steps of FIG. 5A will be operable with respect to multiple mobile units substantially simultaneously and, therefore, it is possible that the criteria for making a beam configuration update in the beam configuration database may be met by operation of the algorithm with respect to other mobile units during operation by the selected mobile unit. Accordingly, in order to avoid a case where operation of the algorithm with respect to the selected mobile unit and a beam configuration which is no longer the current configuration, a beam configuration change determination is made at step 510 prior to updating accumulated measurements associated with a now changed beam configuration.

If at step 510 it is determined that the beam configuration for the particular segment has changed in the beam configuration database then processing preferably returns to step 503 for implementation of the new beam configuration. However, if it is determined that the beam configuration for the particular segment has not changed in the beam configuration database then processing preferably proceeds to step 511.

At step 511 a frame counter and frame error counter associated with the particular segment are preferably updated. According to the illustrated embodiment, a frame counter (FC) and frame error counter (FE) associated with the particular segment are updated in beam configuration database 523 for use with respect to other mobile units operable within the particular segment. For example, the number of measurement frames and the number of detected bad frames within the measurement period from the preferred embodiment FER reports are accumulated in the frame counter (FC) and frame error counter (FE) of the beam configuration database, respectively.

Accordingly, operation of the algorithm with respect to a plurality of mobile units disposed within the particular segment may combine channel characteristic information by storing channel characteristic information in database 523, e.g., accumulated in the frame counter (FC) and frame error counter (FE) fields, for shared access among the iterations of the algorithm associated with each such mobile unit. For example, the selected mobile unit may experience a first frame error count in a first frame count and add this information to totals stored in the respective fields of database 523. Additionally, the steps of FIG. 5A may be implemented with respect to a second mobile unit operable within the same segment and therefore a second frame error count in a second frame count may be added to these totals stored in the respective fields of database 523 to thereby provide stored frame count and frame error count information with respect to use of the beam configuration with both the selected mobile unit and the second mobile unit.

The illustrated embodiment operates to update local registers, at step 511, with the frame counter and frame error counter associated with the selected mobile unit and the particular segment in addition to accumulation of this information in the beam configuration database. Local registers for storing this information are preferably provided for use with respect to a preferred embodiment local control loop as described herein.

At step 512 a determination is preferably made as to whether the frame counter (FC) associated with the particular segment is greater than a predetermined value ($FC_{thres}$). According to the illustrated embodiment, if the frame counter reaches the predetermined value, a number of reports associated with the operation of various mobile units within the particular sector using the alternative beam configuration has been reached and, therefore, a broad enough sample has been taken to make a determination as to which segment beam configuration as between the current beam configuration (BWave stored in the beam configuration database) or the alternative beam configuration (that presently implemented and for which reports have been taken) should be implemented. According to the preferred embodiment, this predetermined value $FC_{thres}$ is selected to be greater than the trial counter in order to ensure that multiple mobile units are sampled for the beam configuration determination. The particular value of this predetermined value $FC_{thres}$ may be selected based on a number of considerations, including the size of the segment, the complexity of the scattering pattern associated with the segment, the topology of the segment, user patterns within the communication system and/or the segment, and the like.

If at step 512 it is determined that the frame counter (FC) associated with the particular segment is not greater than the predetermined value, indicating that a desired number of reports with respect to the particular sector have not been made, processing preferably proceeds to step 516 where it is determined if the selected mobile unit has remained within the particular segment long enough to warrant operation of a local control loop (as described in detail below). If the selected mobile unit has not remained in the particular segment for a time long enough to warrant operation of a local control loop, then processing preferably proceeds to step 522 where, if the selected mobile unit has not changed segments, segment beam configuration determination processing preferably returns to step 505, but, if the selected mobile unit has changed segments, segment beam configuration determination processing returns to step 501.

However, if it is determined at step 512 that the frame counter (FC) associated with the particular segment is greater than the predetermined value, indicating that the a desired number of reports with respect to the particular sector have been made, processing preferably proceeds to step 513 for selection of the more optimum beam configuration. Step 513 preferably provides selection of a beam configuration for storing in the beam configuration database as a new current beam configuration from among the current beam configuration (BWave presently stored in the beam configuration database) and the alternative beam configuration (that presently implemented and for which reports have been taken). For example, the current beam configuration index i is set to either i, indicating the current beam configuration remains the more optimum, or i+1, indicating the alternative beam configuration is the more optimum. A preferred embodiment algorithm for selection of a more optimum beam configuration as may be implemented at step 513 is discussed in detail below with respect to FIG. 5B.

After selection of a more optimum beam configuration, processing preferably proceeds to step 514 where the beam configuration database is updated to reflect selection of the more optimum beam configuration. Also at step 514 of the illustrated embodiment, segment control loop counters, such as the frame counter and frame error counter, stored in the beam configuration database are reset as is consistent with the completion of a segment control loop iteration.

Processing preferably proceeds to step 516 where it is determined if the selected mobile unit has remained within the particular segment long enough to warrant operation of a local control loop (as described in detail below). If the selected mobile unit has not remained in the particular segment for a time long enough to warrant operation of a local control loop, then processing preferably proceeds to step 522 where, if the selected mobile unit has not changed segments, segment beam configuration determination processing preferably returns to step 505, but, if the selected mobile unit has changed segments, segment beam configuration determination processing returns to step 501.

It should be appreciated that the above description of the operation of the algorithm of FIG. 5A provides segment beam configuration optimization, or a segment control loop, which prevents a mobile unit exhibiting usage patterns which may result in a segment beam configuration which is not desirable for use throughout the particular segment from dominating the segment beam configuration determination. The preferred embodiment algorithm operates to provide further optimization of an individual beam configuration for such mobile units as described in the steps below. Of course, rather than providing individual beam configuration optimization, such a mobile unit may simply be omitted from segment beam configuration optimization while continuing to be provided a link using the segment beam configuration, if desired. It should be appreciated that the individual beam configuration referred to herein may actually include some subset or plurality of mobile units for which beam configuration optimization is provided separate from the segment beam configuration optimization of the present invention.

The illustrated embodiment individual control loop begins at step 516, as may be arrived at either by a determination at step 512 that the segment frame counter has not exceeded a predetermined number or after the beam configuration database has been updated with a newly determined more optimum beam configuration at step 514. It should be appreciated that, although described as beginning at step 516, the individual control loop of the preferred embodiment actually shares some steps (e.g. steps 505–509) with the aforementioned segment control loop.

At step 516 a determination is made as to whether a trial counter associated with the selected mobile has exceeded a predetermined number of trials (N1). It should be appreciated that, according to the illustrated embodiment, the selected mobile unit staying in the particular segment for more than N1 trials contributes N1 trial reports to the segment beam configuration optimization determination and, therefore, provides useful segment information. However, the operation of this embodiment prevents this mobile unit from dominating the segment beam configuration optimization input.

If it is determined at step 516 that the trial counter associated with the selected mobile unit has not exceed the predetermined number of trials then the local control loop is not implemented and processing proceeds to step 522 where, if the selected mobile unit has not changed segments, segment beam configuration determination processing preferably returns to step 505, but, if the selected mobile unit has changed segments, segment beam configuration determination processing returns to step 501.

However, if it is determined at step 516 that the trial counter associated with the selected mobile unit has exceeded the predetermined number of trials, then the mobile unit has remained within the particular segment a sufficiently long period of time to result in further segment beam configuration optimization using information with respect to this mobile unit potentially providing a segment beam configuration which is not desirable for use by other mobile units within the particular segment. Accordingly, the local control loop of the illustrated embodiment is implemented and processing proceeds to step 517 where the individual flag is set to one to indicate implementation of the local control loop.

At step 518 a determination is made as to whether the trial counter associated with the selected mobile unit has reached a predetermined value N2 (N2 preferably being greater than N1). This predetermined value is preferably a number of trials selected to provide a sufficient observation period for optimization of a beam configuration for use with the selected mobile unit.

If it is determined at step 518 that the trial counter associated with the selected mobile unit has not reached the predetermined value, processing proceeds to step 522 where, if the selected mobile unit has not changed segments, segment beam configuration determination processing preferably returns to step 505 (and ultimately to step 515 for updating of local registers with channel characteristic information), but, if the selected mobile unit has changed segments, segment beam configuration determination processing returns to step 501. However, if it is determined at step 518 that the trial counter associated with the selected mobile unit has reached the predetermined value, processing proceeds to step 519 for selection of the more optimum beam configuration.

Step 519 preferably provides selection of a beam configuration for use by the selected mobile unit from among the current beam configuration (that presently stored in the beam configuration database) and the alternative beam configuration (that presently implemented and for which reports have been taken). A preferred embodiment algorithm for selection of a more optimum beam configuration as may be implemented at step 519 is discussed in detail below with respect to FIG. 5B. According to the preferred embodiment the beam configuration selected at step 519 is not stored in the beam configuration database as a new current beam configuration, because the selection of a more optimum beam configuration in the local control loop portion of the illustrated algorithm is with respect to the selected mobile unit and not with respect to the segment.

After selection of a more optimum beam configuration, processing preferably proceeds to step 520 where the local frame counter and frame error counter registers are preferably reset to reflect selection of the more optimum beam configuration. At step 521 of the illustrated embodiment, a local control loop counter, such as the trial counter, is reset as is consistent with the completion of a local control loop iteration.

Processing preferably proceeds to step 522 where it is determined if the selected mobile unit has moved from the particular segment. If the selected mobile unit has not changed segments, beam configuration determination processing preferably returns to step 505. However, if the selected mobile unit has changed segments, beam configuration determination processing preferably returns to step 501.

According to a preferred embodiment, the algorithm of FIG. 5A is operable for all active mobile units at all times of the day, whether peak or off-peak hours. Preferably the algorithm is continued until a mobile unit communications are terminated or the mobile unit leaves a segment. If the mobile unit moves to a new segment, the algorithm is preferably started for the new segment. Of course, alternative embodiments of the present invention may implement the above algorithm differently. For example, the algorithm may be operable only during off-peak hours, or until a steady state has been reached with respect to beam configuration optimization (perhaps periodically thereafter to adapt to topology or other changes).

Figure 5B:
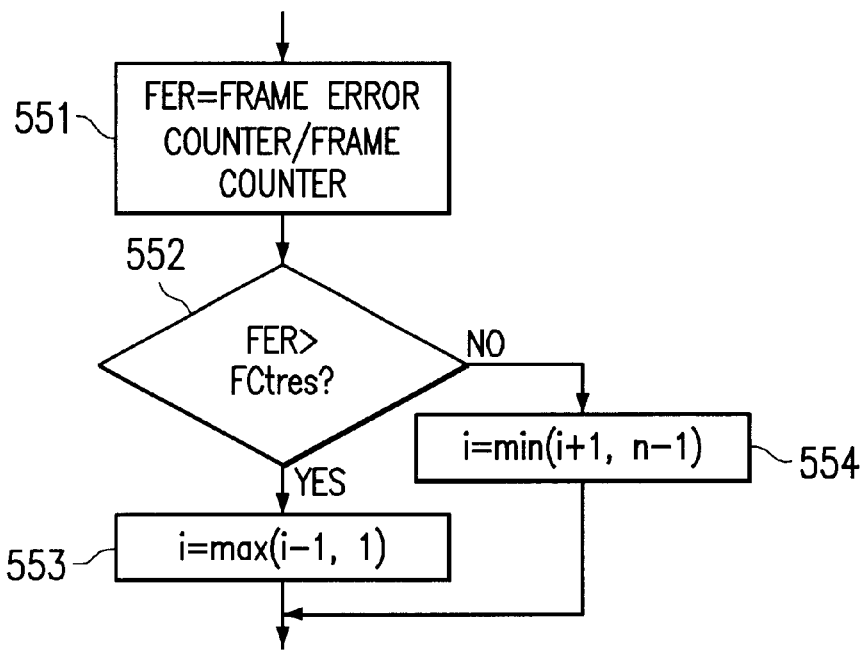
FIG. 5B shows a flow diagram of a preferred embodiment determination of a more optimum beam configuration.

Directing attention to FIG. 5B, a preferred embodiment algorithm for selecting a more optimum beam configuration according to the present invention is shown. The selection algorithm of FIG. 5B may be utilized with the control loop of FIG. 5A or even that of FIG. 3, discussed above. At step 551 the experienced frame error rate is preferably determined by dividing the measured frame error counter by the frame counter.

At step 552 a determination is made as to whether the determined frame error rate is greater than a frame error rate threshold ($FER_{thes}$). The threshold frame error rate may be determined as described above with respect to FIG. 4. It should be appreciated that the algorithm of FIG. 5B may be implemented for different beam configuration determinations, such as that of the segment beam configuration optimization and the local beam configuration optimization of the embodiment of FIG. 5A. Accordingly, the threshold frame error rate may be selected or modified based upon the particular beam configuration determinations actually being made, For example, because a sector beam configuration is to be used with respect to an area in which there may be variation in the forward link channel spatial characteristics, the frame error rate threshold may be selected to be relative small so as to minimize the possibility that a mobile unit operable within the sector will experience an unacceptable frame error rate using the beam configuration. However, because an individual beam configuration is used with a single or subset of mobile units, the frame error rate threshold may be selected to be relatively large.

If at step 522 the determined frame error rate is greater than the threshold frame error rate, then processing preferably proceeds to step 553 for selection of a next less aggressive beam configuration (i=i−1). It should be appreciated that when even when the current beam configuration, as between a current beam configuration and a more aggressive alternative beam configuration, is determined to provide the more acceptable link characteristics the illustrated embodiment operates to select the new current beam configuration which is a less aggressive beam configuration than the then current beam configuration. Using this less aggressive beam configuration as the new current beam configuration (BWave=i−1), a next iteration of the optimization algorithm will operate to compare use of the less aggressive beam configuration and the former beam configuration to thereby determine if a more optimum beam configuration is a less aggressive beam configuration. Such an embodiment provides bidirectional optimization and is well suited to adapt to changes in topology, such as the construction of a building within a segment, etcetera.

If at step 522 the determined frame error rate is less than or equal to the threshold frame error rate, then processing preferably proceeds to step 554 for selection of the next more aggressive beam configuration (i=i+1). Accordingly, in operation according to the preferred embodiment of FIG. 5A, the new current beam configuration will be the alternative beam configuration (BWave=i+1).

Although the embodiment of FIGS. 5A and 5B have been discussed with respect to comparing a determined frame error rate associated with the use of an alternative beam configuration to a threshold frame error rate in determining a more optimum beam configuration, it should be appreciated that the present invention may utilize other methods of determining a more optimum beam configuration. For example, the embodiment of FIG. 5A may be adapted to implement the comparison of the beam configurations discussed above with reference to FIG. 3, if desired.

Although the present invention has been discussed above with respect operation of algorithms of the present invention only, it should be appreciated that the link optimization techniques of the present invention may be implemented in cooperation with other communication link control systems. For example, mobile units operating according to IS-95 and GSM protocols allow for mobile unit feedback, such as the mobile unit providing a pilot measurement message, for power level control. The present invention may operate with this feedback information in determining beam characteristics in cooperation with the protocol's operation or separate therefrom.

Figure 6:
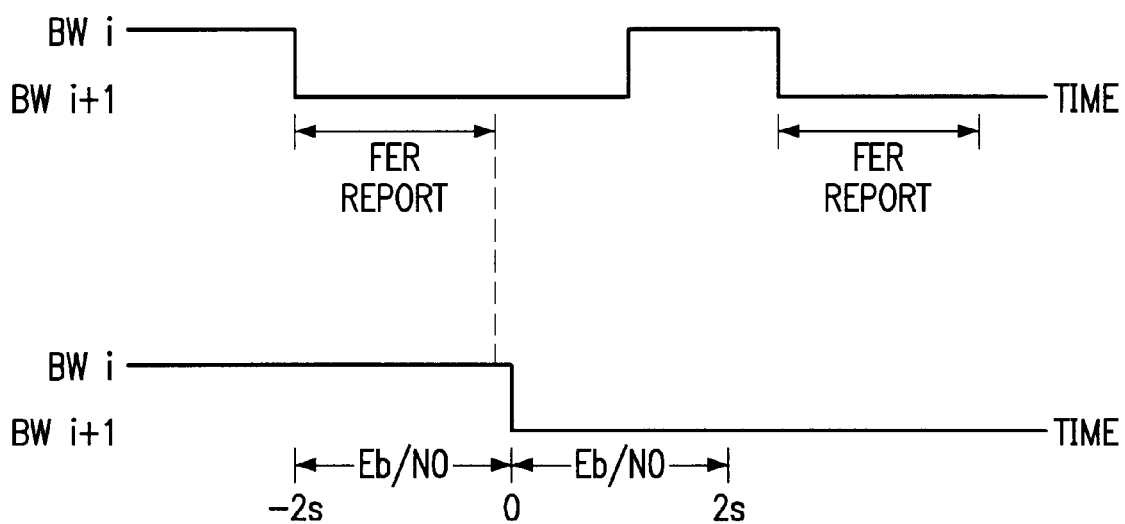
FIG. 6 shows a timing diagram of a channel characteristic report utilized according to a preferred embodiment of the present invention.

For example, in a system utilizing a protocol implementing power level control, such as IS-95, the present invention may operate to confirm that the power level adjustment is not the source of and/or the solution to the presently measured channel characteristics to avoid anomalous operation associated with each control loop attempting to address a same observed phenomena. For example, the aforementioned power control techniques often attempt to redress increases in detected error rates through increased transmit power levels. Accordingly, a preferred embodiment of the present invention operates to obtain channel characteristic information, such as the aforementioned frame error reports, just after a change in beam configuration before a power control loop has reacted to redress any resulting channel characteristic changes, such as an increase or decrease in frame error rate. A timing diagram illustrating the timing of a frame error report as may be used according to this embodiment of the present invention is shown in FIG. 6 As shown in FIG. 6, the earlier frame error report is preferably utilized according to this embodiment of the invention while the later frame error report is ignored.

Although the preferred embodiment has been described above with respect to providing beam forming in the forward link, it should be appreciated that communication link optimization according to the present invention is not limited to beam forming. For example, a set of complex weights may be applied to the signals of an antenna array to provide a signal optimized for experienced channel conditions without forming a typical antenna beam but rather a plurality of signals which constructively combine at a given point in the system to provide a desired communication link. Moreover, it should be appreciated that the concepts of the present invention are not limited forward channel links and/or wireless communications, but may be applied to any communication channel in which the a communication link is to be optimized for channel conditions experienced without requiring a large amount of feedback information.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for optimizing a communication link, said method comprising:

dividing a service area associated with a first communication system into a plurality of segments;

associating a unique link configuration with each segment of said plurality of segments;

implementing a control loop for a first segment of said plurality of segments when a remote communication system is operating therein, whereby a first link configuration of said unique link configurations associated with said first segment is adjusted as a function of link conditions experienced by said remote communication system, wherein said implementing a control loop for a first segment comprises:

determining a position of said first remote communication system and therefore a segment of said service area said first remote communication system is operable within;

identifying said first link configuration associated with said determined segment;

providing a communication link to said first remote communication system using said identified first link configuration;

monitoring a communication attribute of said communication link provided using said identified first link configuration;

determining an alternative link configuration for use with said determined segment;

providing a communication link to said first remote communication system using said alternative link configuration;

monitoring a communication attribute of said communication link provided using said alternative link configuration; and determining a link configuration to use in providing a communication link in the future based at least in part on said communication attributes monitored with respect to said identified first link configuration and said alternative link configuration; and implementing a control loop for a second segment of said plurality of segments when said remote communication system is operating therein, whereby a second link configuration of said unique link configurations associated with said second segment is adjusted as a function of link conditions experienced by said remote communication system.

2. The method of claim 1, wherein said service area comprises a cell of a cellular communication system.

3. The method of claim 2, wherein said unique link configurations associated with said segments provide information with respect to characteristics of a wireless link.

4. The method of claim 3, wherein said unique link configurations comprise an antenna beam forming attribute.

5. The method of claim 4, wherein said antenna beam forming attribute comprises an antenna beam width, and wherein said adjusting said link configuration associated with at least one of said first segment and said second segment comprises narrowing said antenna beam width.

6. The method of claim 4, wherein said antenna beam forming attribute comprises an antenna beam orientation, and wherein said adjusting said link configuration associated with at least one of said first segment and said second segment comprises changing said antenna beam orientation.

7. The method of claim 6, wherein said antenna beam orientation comprises an azimuthal aspect, and wherein said changing said antenna beam orientation comprises changing said azimuthal aspect.

8. The method of claim 6, wherein said antenna beam orientation comprises an elevation aspect, and wherein said changing said antenna beam orientation comprises changing said elevation aspect.

9. The method of claim 4, wherein said antenna beam forming attribute comprises an antenna beam length, and wherein said adjusting said link configuration associated with at least one of said first segment and said second segment comprises changing said antenna beam length.

10. The method of claim 3, wherein said wireless link is a forward link from a base transceiver station of said cell to a communication system in communication therewith.

11. The method of claim 10, wherein said first remote communication system comprises a cellular telephone handset.

12. The method of claim 1, wherein a size of segments of said plurality of segments is based at least in part on a level of resolution available in determining a position of said first remote communication system.

13. The method of claim 12, wherein said determining a position of said first remote communication system comprises:

determining an angle of arrival of a signal associated with said first remote communication system; and determining a distance to said first remote communication system.

14. The method of claim 12, wherein said size of segments is approximately 100 m by 100 m.

15. The method of claim 1, wherein said determining a position of said first remote communication system comprises:

determining an angle of arrival of a signal associated with said first remote communication system; and determining a distance to said first remote communication system.

16. The method of claim 1, wherein said communication attribute monitored comprises set point information.

17. The method of claim 1, wherein said communication attribute monitored comprises a frame error rate.

18. The method of claim 1, wherein said communication attribute monitored comprises a ratio of average bit energy to noise energy.

19. The method of claim 1, wherein said determining an alternative link configuration comprises:

determining if said identified first link configuration is at a system limit and, if so, determining said alternative link configuration to back off of said system limit.

20. The method of claim 1, wherein said determining a link configuration to use comprises:

determining one of said identified first link configuration and said alternative link configuration to use in providing a communication link in the future.

21. The method of claim 1, wherein implementing a control loop for a first segment comprises:
  limiting an extent by which said link conditions experienced by said remote communication system result in adjusting said first link configuration associated with said first segment.

22. The method of claim 21, wherein implementing a control loop for a first segment further comprises:
  implementing a control loop for said remote communication system during a time in which the extent by which said link conditions experienced by said remote communication system result in adjusting said first link configuration associated with said first segment are limited.

23. The method of claim 21, wherein said limiting an extent by which said link conditions experienced by said remote communication system result in adjusting said first link configuration associated with said first segment is provided at least in part through a determination of a number of link condition reports associated with said remote communication system.

24. The method of claim 1, wherein a link configuration initially associated with segments of said plurality of segments comprises a generally accepted non-optimized link configuration.

25. The method of claim 24, wherein said generally accepted non-optimized link configuration provides a substantially conventional sector configuration.

26. A system for optimizing a communication link, said system comprising:
  a communication system having a service area associated therewith, wherein a plurality of segments are established within said service area;
  a database storing link configuration information for a plurality of communication links, wherein communication links of said plurality of communication links are associated with corresponding segments of said plurality of segments;
  a controller in communication with said communication system and said database, wherein said controller includes operating instructions to determine a segment of said service area a mobile unit is operating within, to identify link configuration information associated with said determined segment from available said link configuration information stored in said database, and to accept information with respect to said mobile unit operating within said determined segment using a link configured according to said identified link configuration information, wherein said controller further includes operating instructions to determine alternative link configuration information for use with said determined segment and to accept information with respect to said mobile unit operating within said determined segment using a link configured according to said alternative link configuration, and wherein said controller includes operating instructions to determine a current optimized link configuration from said accepted information with respect to said mobile unit operating using said identified link configuration information and said alternative link configuration information.

27. The system of claim 26, wherein said communication link is a forward link and said accepted information is provided through a corresponding reverse link.

28. The system of claim 26, wherein said communication system comprises:
  an array antenna providing a plurality of antenna elements from which angle of arrival of a signal received from said mobile unit is determinable, wherein said determined segment is determined at least in part through reference to angle of arrival information derived from use of said array antenna.

29. The system of claim 28, wherein said communication system further comprises:
  circuitry for determining signal delay associated with said mobile unit, wherein said determined segment is also determined at least in part through reference to said delay information.

30. The system of claim 26, wherein said communication system comprises a cellular base station, and wherein said service area comprises a cell of a cellular communication system.

31. The system of claim 30, wherein a size of said segments is selected at least in part through reference to a resolution of a location determination ability associated with said communication system.

32. The system of claim 31, wherein said segments are established in a grid arrangement throughout said cell.

33. The system of claim 26, wherein the link configuration information stored in the database comprises:
  current link configuration information.

34. The system of claim 33, wherein said current link configuration information associated with at least one segment of said plurality of segments comprises an initial link configuration determined to provide a minimum level of system performance.

35. The system of claim 33, wherein said current link configuration information comprises a most current optimized link configuration for each segment of said plurality of segments.

36. The system of claim 33, wherein the link configuration information stored in the database further comprises:
  historical link configuration information.

37. The system of claim 33, wherein said historical link configuration information comprises a previous link configuration associated with at least one segment of said plurality of segments which is has been implemented in the past for providing a communication link in the corresponding segment but which is not currently considered to be a most optimized link configuration.

38. The system of claim 37, wherein said previous link configuration provides a larger antenna beam than a corresponding current optimized link configuration.

39. The system of claim 37, wherein said previous link configuration provides a smaller antenna beam than a corresponding current optimized link configuration.

40. The system of claim 37, wherein said previous link configuration is stored in the database to provide a link configuration for use when a corresponding current optimized link configuration is determined to provide undesired attributes.

41. The system of claim 37, wherein said previous link configuration is stored in the database to provide a link configuration which should not be implemented in the future.

42. The system of claim 26, wherein said link configuration information comprises antenna beam forming attributes.

43. The system of claim 42, wherein said antenna beam forming attributes comprise an antenna beam width.

44. The system of claim 42, wherein said antenna beam forming attributes comprise an antenna beam length.

45. The system of claim 42, wherein said antenna beam forming attributes comprise an antenna beam orientation.

46. The system of claim 26, wherein said accepted information with respect to said mobile unit operating using said identified link configuration information and said alternative link configuration information comprises a set point.

47. The system of claim 46, wherein said accepted information with respect to said mobile unit operating using said identified link configuration information and said alternative link configuration information comprises a frame error rate.

48. The system of claim 46, wherein said accepted information with respect to said mobile unit operating using said identified link configuration information and said alternative link configuration information comprises a ratio of average bit energy to noise energy.

49. The system of claim 26, wherein said controller further includes operating instructions to limit an amount by which information with respect to said mobile unit affects said determination of a current optimized link configuration.

50. The system of claim 49, wherein said limit is established at least in part through a number of channel characteristic reports provided by said mobile unit.

51. The system of claim 49, wherein said controller further includes operating instructions to determine a link configuration for use with said mobile unit separate from said determined current optimized link configuration.

52. A system for optimizing a communication link, said system comprising:
   means for demarcating a plurality of segments within a service area associated with a first communication system;
   means for associating a unique link configuration with each segment of said plurality of segments;
   means for implementing a control loop for a first segment of said plurality of segments when a remote communication system is operating therein, whereby a first link configuration of said unique link configurations associated with said first segment is adjusted as a function of link conditions experienced by said remote communication system, wherein said means for implementing a control loop for a first segment comprises:
      means for determining a segment of said service area said first remote communication system is operable within;
      means for identifying said first link configuration associated with said determined segment;
      means for providing a communication link to said first remote communication system using said identified first link configuration;
      means for monitoring a communication attribute of said communication link provided using said identified first link configuration;
      means for determining an alternative link configuration for use with said determined segment;
      means for providing a communication link to said first remote communication system using said alternative link configuration;
      means for monitoring a communication attribute of said communication link provided using said alternative link configuration; and
      means for determining a link configuration to use in providing a communication link in the future based at least in part on said communication attributes monitored with respect to said identified first link configuration and said alternative link configuration; and
   means for implementing a control loop for a second segment of said plurality of segments when said remote communication system is operating therein, whereby a second link configuration of said unique link configurations associated with said second segment is adjusted as a function of link conditions experienced by said remote communication system.

53. The system of claim 52, wherein said service area comprises a cell of a cellular communication system.

54. The system of claim 53, wherein said first remote communication system comprises a cellular telephone handset.

55. The system of claim 54, further comprising:
   means for determining a position of said first remote communication system.

56. The system of claim 55, wherein said means for determining comprises:
   means for determining an angle of arrival of a signal associated with said first remote communication system; and
   means for determining a distance to said first remote communication system.

57. The system of claim 52, wherein said unique link configurations comprise an antenna beam forming attribute.

58. The system of claim 52, wherein said monitored communication attribute comprises a frame error rate.

59. The system of claim 52, wherein said monitored communication attribute comprises a ratio of average bit energy to noise energy.

60. The system of claim 52, wherein said means for determining a link configuration to use comprises:
   means for determining one of said identified first link configuration and said alternative link configuration to use in providing a communication link in the future.

61. The system of claim 52, wherein said means for implementing a control loop for a first segment comprises:
   means for limiting an extent by which said link conditions experienced by said remote communication system result in adjusting said first link configuration associated with said first segment.

62. The system of claim 61, wherein implementing a control loop for a first segment further comprises:
   means for implementing a control loop for said remote communication system during a time in which the extent by which said link conditions experienced by said remote communication system result in adjusting said first link configuration associated with said first segment are limited.

63. The system of claim 61, wherein said means for limiting an extent by which said link conditions experienced by said remote communication system result in adjusting said first link configuration associated with said first segment is provided at least in part through a determination of a number of link condition reports associated with said remote communication system.

64. A method for optimizing a forward link using a minimum amount of reverse link feedback, said method comprising:
   dividing a service area associated with a first communication system into a plurality of segments;
   storing a current communication link configuration associated with a first communication link channel for each segment of said plurality of segments; and
   implementing a control loop optimizing a forward link for use in a first segment of said plurality of segments, wherein said control loop comprises:
      determining that a second communication system is operating within said first segment;
      retrieving a current communication link configuration for said first segment from said stored current communication link configurations;

utilizing said retrieved current communication link configuration in providing forward link communication between said first communication system and said second communication system;

monitoring a link channel attribute associated with said utilization of said retrieved current communication link configuration;

providing information feedback with respect to said monitored link channel attribute;

determining a next communication link configuration for said first segment;

utilizing said determined next communication link configuration in providing forward link communication between said first communication system and said second communication system;

monitoring a link channel attribute associated with said utilization of said determined next communication link configuration;

providing information feedback with respect to said monitored link channel attribute; and determining a preferred one of said retrieved current communication link configuration and said determined next communication link configuration as a function of said information feedback associated with said retrieved current communication link configuration and said monitored link channel attribute associated with said determined next communication link configuration.

65. The method of claim 64, wherein said first communication system comprises a cellular base transceiver station, said second communication system comprises a subscriber communication unit, and said service area comprises a cell of a cellular communication system.

66. The method of clam 64, further comprising:

implementing a control loop optimizing a forward link for use in a second segment of said plurality of segments, wherein said control loop comprises:

determining a that said second communication system is operating within said second segment;

retrieving a current communication link configuration for said second segment from said stored current communication link configurations;

utilizing said retrieved current communication link configuration in providing forward link communication between said first communication system and said second communication system;

monitoring a link channel attribute associated with said utilization of said retrieved current communication link configuration;

providing information feedback with respect to said monitored link channel attribute;

determining a next communication link configuration for said second segment;

utilizing said determined next communication link configuration in providing forward link communication between said first communication system and said second communication system;

monitoring a link channel attribute associated with said utilization of said determined next communication link configuration;

providing information feedback with respect to said monitored link channel attribute; and determining a preferred one of said retrieved current communication link configuration and said determined next communication link configuration as a function of said information feedback associated with said retrieved current communication link configuration and said monitored link channel attribute associated with said determined next communication link configuration.

67. The method of claim 64, wherein said control loop further comprises:

limiting an extent by which said link channel attributes monitored by said second communication system affect the determination of a preferred one of said retrieved current communication link configuration and said determined next communication link configuration to thereby prevent domination of said determination by information associated with said second communication system.

* * * * *